United States Patent
Shibahara et al.

(10) Patent No.: US 7,863,374 B2
(45) Date of Patent: Jan. 4, 2011

(54) SELF-CURABLE WATER-BASED SOLID ADHESIVE AND BONDING METHOD USING THE SELF-CURABLE WATER-BASED SOLID ADHESIVE

(75) Inventors: Syunsuke Shibahara, Osaka (JP); Kuniharu Harada, Osaka (JP); Shinsa Hamada, Osaka (JP); Kenji Ueji, Osaka (JP); Kenji Idemoto, Osaka (JP)

(73) Assignee: Konishi Co., Ltd., Osaka (JP)

( * ) Notice: Subject to any disclaimer, the term of this patent is extended or adjusted under 35 U.S.C. 154(b) by 1214 days.

(21) Appl. No.: 11/434,216

(22) Filed: May 16, 2006

(65) Prior Publication Data

US 2008/0119607 A1 May 22, 2008

Related U.S. Application Data

(62) Division of application No. 10/473,948, filed on Oct. 6, 2003, now Pat. No. 7,084,203.

(30) Foreign Application Priority Data

Sep. 28, 2001 (JP) .............................. 2001-302962

(51) Int. Cl.
- C08J 3/00 (2006.01)
- C08K 3/20 (2006.01)
- C08L 75/00 (2006.01)
- C08L 83/00 (2006.01)
- C08L 83/04 (2006.01)
- C08G 18/08 (2006.01)
- C08G 18/28 (2006.01)
- C08G 77/04 (2006.01)
- C08G 77/06 (2006.01)
- C08G 77/26 (2006.01)
- C09J 4/00 (2006.01)
- C09J 7/02 (2006.01)
- C09J 101/00 (2006.01)
- C09J 201/00 (2006.01)
- D06M 15/643 (2006.01)

(52) U.S. Cl. .................... 524/588; 156/329; 156/330.9; 156/331.7; 524/589; 524/590; 524/591; 524/837; 524/839; 524/838; 524/840; 528/28; 528/38

(58) Field of Classification Search ................. 156/329, 156/330.9, 331.7; 524/588, 589, 590, 591, 524/837, 839, 840, 838; 528/28, 38
See application file for complete search history.

(56) References Cited

U.S. PATENT DOCUMENTS

| 4,746,696 A | 5/1988 | Gierenz |
| 5,932,652 A | 8/1999 | Roesler et al. |
| 5,952,445 A | 9/1999 | Roesler et al. |
| 6,005,047 A | 12/1999 | Shaffer |
| 6,077,901 A | 6/2000 | Roesler et al. |
| 6,077,902 A | 6/2000 | Roesler et al. |

FOREIGN PATENT DOCUMENTS

| JP | 4-506533 | 11/1992 |
| JP | 2000-169544 A1 | 6/2000 |
| JP | 2001-031757 | 2/2001 |
| JP | 2001-031947 | 2/2001 |
| JP | 2001-278936 A | 10/2001 |
| WO | WO-91/00322 | 1/1991 |

OTHER PUBLICATIONS

Machine translation of JP 2001-278936, Shinsuke et al., Oct. 2001.*

* cited by examiner

Primary Examiner—Patrick D Niland
(74) Attorney, Agent, or Firm—Birch, Stewart, Kolasch & Birch LLP

(57) ABSTRACT

Self-curable water-based solid adhesives of this invention include the following components (A), (B), (C), and (D):

(A) an anionic-group-containing polymer terminally having an alkoxysilyl group, the polymer being a reaction product of a compound (A1) containing no anionic group and having plural isocyanate-reactive groups, a compound (A2) having an anionic group and plural isocyanate-reactive groups, a polyisocyanate compound (A3), and an alkoxysilane compound (A4) containing an isocyanate-reactive group;

(B) a basic compound;

(C) water; and (D) a gelling agent.

The self-curable water-based solid adhesives of the present invention can be applied with good workability, have good fitting after attachment, have good adhesion to plastics, metals and glass and exhibit excellent heat resistance and water resistance after curing. They are highly safe to humans and the environment. They also have excellent shape retention and slidability and can be easily applied. In addition, they can bond adherends by contact bonding despite that they are water-based solid adhesives. Accordingly, the self-curable water-based solid adhesives of this invention are very useful as stick adhesives.

18 Claims, 5 Drawing Sheets

SELF-CURABLE WATER-BASED SOLID ADHESIVE AND BONDING METHOD USING THE SELF-CURABLE WATER-BASED SOLID ADHESIVE

This application is a Divisional of application Ser. No. 10/473,948, filed on Oct. 6, 2003 now U.S Pat. No. 7,084,203, the entire contents of which are hereby incorporated by reference and for which priority is claimed under 35 U.S.C. §120.

TECHNICAL FIELD

The present invention relates to a water-based solid adhesive and a bonding method using the water-based solid adhesive. More specifically, it relates to a water-based solid adhesive exhibiting good adhesion to various adherends and having excellent water resistance and heat resistance, and to a bonding method using the water-based solid adhesive.

BACKGROUND ART

Stick adhesives mainly comprising a water-soluble polymer, a gelling agent, and water can be easily applied, have good fitting after attachment and are therefore widely used as water-based solid adhesives. However, the fact is that these stick adhesives are used in bonding of paper, since the water-soluble polymer itself exhibits adhesion to adherends in a very limited range. Demands have therefore been made on development of stick adhesives that can adhere to, for example, wood, plastics, and metals. As a possible solution to this problem, a stick adhesive comprising a water-based polyurethane dispersion has been proposed as described in Japanese Patent No. 2836957. However, this stick adhesive exhibits insufficient adhesion to metals and glass, although it has improved adhesion to plastics. The stick adhesive also has insufficient heat resistance and water resistance, since the water-based polyurethane dispersion is a non-reactive polymer and is substantially linear polymer. If an amine chain extender is added to such a water-based polyurethane dispersion for imparting heat resistance and water resistance, the resulting water-based polyurethane dispersion has a high molecular weight of several hundred thousands, constitutes an emulsion having a relatively large particle size and cannot be significantly molded into a stick adhesive.

DISCLOSURE OF INVENTION

Accordingly, an object of the present invention is to provide a water-based solid adhesive that can be applied with good workability, has good fitting after attachment, exhibits good adhesion to plastics, metals and glass and has excellent heat resistance and water resistance after curing.

Another object of the present invention is to provide a water-based solid adhesive that can perform contact bonding or exhibits further improved initial adhesion, and a bonding method using the water-based solid adhesive.

After intensive investigations to achieve the above objects, the present inventors have found that, when a specific polymer which has an alkoxysilyl group at its end and is cured as a result of a condensation reaction with a silanol group is used as an adhesive component of a water-based solid adhesive, the resulting water-based solid adhesive is self-curable, can be applied with good workability, has good fitting after attachment, can exhibit good adhesion or adhesiveness to plastics, metals and glass, has excellent heat resistance and water resistance after curing and can bond adherends by contact bonding or with further higher initial adhesive strength. The present invention has been accomplished based on these findings.

Specifically, the present invention provides, in an aspect, a self-curable water-based solid adhesive containing the following components (A), (B), (C), and (D):

an anionic-group-containing polymer terminally having an alkoxysilyl group, the polymer being a reaction product of a compound (A1) containing no anionic group and having plural isocyanate-reactive groups, a compound (A2) having an anionic group and plural isocyanate-reactive groups, a polyisocyanate compound (A3), and an alkoxysilane compound (A4) containing an isocyanate-reactive group;

(B) a basic compound;

(C) water; and (D) a gelling agent.

The self-curable water-based solid adhesive of the present invention may be a gelled product of a water-based resin composition by action of the gelling agent (D), which water-based resin composition contains the anionic-group-containing polymer (A) terminally having an alkoxysilyl group, the basic compound (B), and water (C). Preferably, the anionic group of the anionic-group-containing polymer (A) terminally having an alkoxysilyl group is neutralized by the basic compound (B), and the alkoxysilyl group at the end of the anionic-group-containing polymer (A) is hydrolyzed by the water (C) in the water-based resin composition gelled by the gelling agent (D).

The anionic-group-containing polymer (A) terminally having an alkoxysilyl group is preferably an anionic-group-containing polymer having an alkoxysilylated end and being a reaction product of an anionic-group-containing polymer and the alkoxysilane compound (A4) containing an isocyanate-reactive group, the anionic-group-containing polymer being a reaction product among the compound (A1) containing no anionic group and having plural isocyanate-reactive groups, the compound (A2) having an anionic group and plural isocyanate-reactive groups, and the polyisocyanate compound (A3).

The compound (A1) containing no anionic group and having plural isocyanate-reactive groups may contain a compound (A1-1) having a number-average molecular weight of equal to or more than 500, containing no anionic group and having plural isocyanate-reactive groups, and a compound (A1-2) having a number-average molecular weight of less than 500, containing no anionic group and having plural isocyanate-reactive groups.

The anionic group for use in the present invention is preferably a carboxyl group. The compound (A2) having an anionic group and plural isocyanate-reactive groups is preferably a dimethylolalkanoic acid.

The isocyanate-reactive group of the alkoxysilane compound (A4) is preferably a primary amino group, a secondary amino group, or a mercapto group.

The alkoxysilane compound (A4) can be an alkoxysilane compound having a secondary amino group and being a reaction product of an alkoxysilane compound having at least a primary amino group, preferably an alkoxysilane group having primary and secondary amino groups, with an unsaturated carboxylic ester (A5).

The self-curable water-based solid adhesive of the present invention preferably further contains a polyoxyalkylene compound (E) having an unsaturated-bond-containing organic group and at least an oxyethylene unit. The polyoxyalkylene compound (E) is preferably a polyoxyalkylene compound having an unsaturated-bond-containing group at its end corresponding to a polyoxyalkylene glycol having at least a polyoxyethylene unit except with one of aryl groups, cycloalkenyl groups, cycloalkadienyl groups, and vinyl group introduced into at least one of ends of the polyoxyalkylene glycol.

The self-curable water-based solid adhesive of the present invention preferably further contains a curing accelerator (F) represented by following Formula (1):

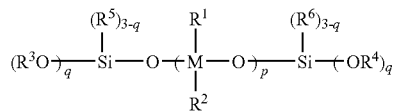

(1)

wherein M is one of tin atom, titanium atom, zirconium atom and bismuth atom; $R^1$ and $R^2$ are the same or different and are each a hydrocarbon group; $R^3$ and $R^4$ are the same or different and are each a hydrogen atom or a hydrocarbon group; $R^5$ and $R^6$ are the same or different and are each a hydrogen atom or a hydrocarbon group; p is an integer equal to or more than 1; and q is an integer from 1 to 3.

The present invention also provides, in another aspect, a bonding method including the step of performing contact bonding using the self-curable water-based solid adhesive.

In yet another aspect, the present invention provides an anionic-group-containing polymer represented by following Formula (2) terminally having an alkoxysilyl group, a salt thereof, or a hydrolyzed polymer being derived from the polymer or the salt thereof and containing a hydrolyzed alkoxysilyl group:

(2)

wherein W is a residue corresponding to a skeleton of an anionic-group-containing polymer; the nitrogen atom combined with W is a nitrogen atom derived from an isocyanate group at the end of the anionic-group-containing polymer; W has a structural unit represented by following Formula (2a):

(2a)

wherein Y is one of a residue derived from a compound (A1) containing no anionic group and having plural isocyanate-reactive groups and a residue derived from a compound (A2) having an anionic group and plural isocyanate-reactive groups; V combined with Y is a group derived from one of the isocyanate-reactive groups of the compound (A1) and the compound (A2), wherein both the residue derived from the compound (A1) and the residue derived from the compound (A2) as Y are contained in the polymer; Z is a residue derived from a polyisocyanate compound (A3), wherein a nitrogen atom combined with Z and a nitrogen atom on the opposite side to Z are nitrogen atoms derived from isocyanate groups of the polyisocyanate compound (A3);

X is an alkoxysilyl-containing group represented by any one of following Formulae (2b), (2c), and (2d):

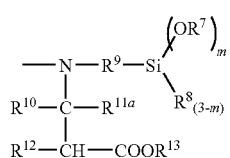

(2b)

wherein $R^7$ and $R^8$ are the same or different and are each an alkyl group; $R^9$ is an alkylene group; $R^{10}$ and $R^{12}$ are the same or different and are each a hydrogen atom or an alkyl group; $R^{11a}$ is a hydrogen atom or an alkyl group; $R^{13}$ is an alkyl group, an aryl group or a cycloalkyl group; and m is an integer from 1 to 3:

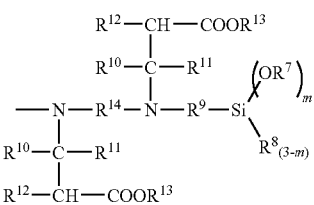

(2c)

wherein $R^7$ and $R^8$ are the same or different and are each an alkyl group; $R^9$ and $R^{14}$ are the same or different and are each an alkylene group; $R^{10}$ and $R^{12}$ are the same or different and are each a hydrogen atom or an alkyl group; $R^{11}$ is one of a hydrogen atom, an alkyl group, an aryl group, an alkoxycarbonyl group, an aryloxycarbonyl group, and a cycloalkyloxycarbonyl group; $R^{13}$ is an alkyl group, an aryl group, or a cycloalkyl group; and m is an integer from 1 to 3:

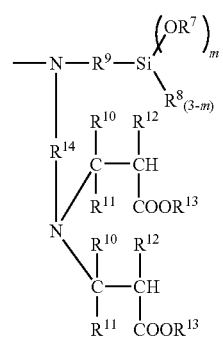

(2d)

wherein $R^7, R^8, R^9, R^{10}, R^{11}, R^{12}, R^{13}, R^{14}$, and m have the same meanings as defined above; and n is an integer from 1 to 4.

In Formula (2a), it is preferred that Y is one of a residue derived from a polyol compound (A1) containing no anionic group and a residue derived from a polyol compound (A2) containing an anionic group; and V combined with Y is an oxygen atom derived from one of a hydroxy group of the polyol compound (A1) and a hydroxyl group of the polyol compound (A2), wherein both the residue derived from the polyol compound (A1) and the residue derived from the polyol compound (A2) are contained in the polymer. It is more preferred that Y is one of a residue derived from a polyol compound (A1-1) containing no anionic group and having a number-average molecular weight of equal to or more than 500, a residue derived from a polyol compound (A1-2) containing no anionic group and having a number-average molecular weight of less than 500, and a residue derived from the polyol compound (A2) containing an anionic group; and V combined with Y is an oxygen atom derived from one of a hydroxy group of the polyol compound (A1-1), a hydroxyl group of the polyol compound (A1-2), and a hydroxyl group of the polyol compound (A2), and wherein all the residue derived from the polyol compound (A1-1), the residue derived from the polyol compound (A1-2), and the residue derived from the polyol compound (A2) are contained in the polymer.

The anionic-group-containing polymer represented by Formula (2) terminally having an alkoxysilyl group can be preferably obtained by, for example, a reaction of an anionic-group-containing polymer with at least one secondary-amino-group-containing alkoxysilane compound, which anionic-group-containing polymer being a reaction product among the polyol compound (A1-1) containing no anionic group and having a number-average molecular weight of equal to or more than 500; the polyol compound (A1-2) containing no anionic group and having a number-average molecular weight of less than 500; the polyol compound (A2) containing an anionic group; and the polyisocyanate compound (A3), and the at least one secondary-amino-group containing alkoxysilane compound is selected from alkoxysilane compounds each having one secondary amino group represented by one of following Formulae (3a), (3b) and (3c):

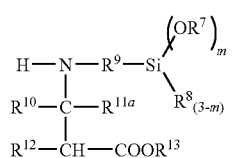

(3a)

wherein $R^7$, $R^8$, $R^9$, $R^{10}$, $R^{11a}$, $R^{12}$, $R^{13}$, and m have the same meanings as defined above;

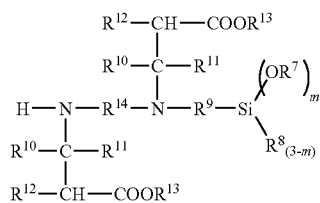

(3b)

wherein $R^7$, $R^8$, $R^9$, $R^{10}$, $R^{11}$, $R^{12}$, $R^{13}$, $R^{14}$ and m have the same meanings as defined above;

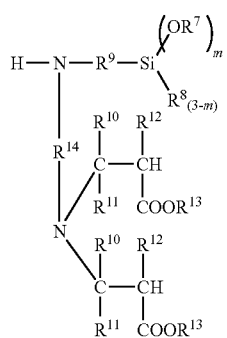

(3c)

wherein $R^7$, $R^8$, $R^9$, $R^{10}$, $R^{11}$, $R^{12}$, $R^{13}$, $R^{14}$, and m have the same meanings as defined above.

BEST MODE FOR CARRYING OUT THE INVENTION

Figure 1:
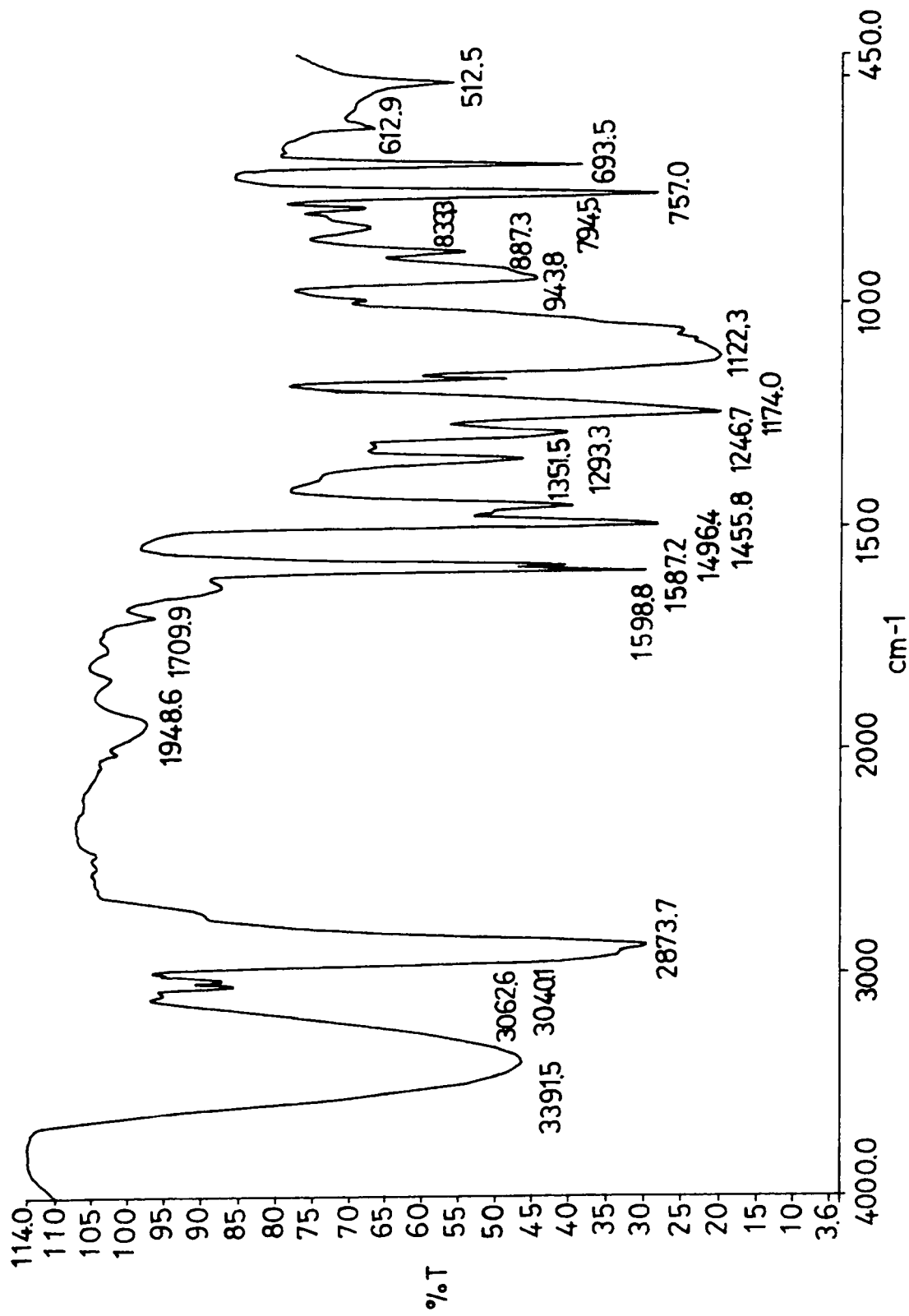
FIG. 1 is a graph showing infrared absorption spectral data of a hydrophilic compound (1) (a polyethylene glycol having a phenylated end).

The anionic-group-containing polymer (A) terminally having an alkoxysilyl group is obtained as a result of a reaction among a compound (A1) containing no anionic group and having plural isocyanate-reactive groups, a compound (A2) having an anionic group and plural isocyanate-reactive groups, a polyisocyanate compound (A3), and an alkoxysilane compound (A4) containing an isocyanate-reactive group.

[Compounds (A1) Containing No Anionic Group and Having Plural Isocyanate-Reactive Groups]

The compound (A1) containing no anionic group and having plural isocyanate-reactive groups (hereinafter may be referred to as "isocyanate-reactive compound (A1)") is not specifically limited as long as it is a compound containing no anionic group and having at least two isocyanate-reactive groups in its molecule. The isocyanate-reactive groups are not specifically limited, as long as they are groups having reactivity to isocyanate groups. Such isocyanate-reactive groups include, for example, hydroxyl group, primary amino group (unsubstituted amino group), secondary amino groups (mono-substituted amino groups), and mercapto group. The plural isocyanate-reactive groups may comprise one type of the isocyanate-reactive group or two or more types of the isocyanate-reactive groups in combination. Hydroxyl group, primary amino group, and secondary amino groups are preferred as the isocyanate-reactive group for use in the present invention, of which hydroxyl group is especially preferred. Accordingly, the isocyanate-reactive compound (A1) can be, for example, polyol compounds containing no anionic group, polyamine compounds containing no anionic group, and polythiol compounds containing no anionic group, of which polyol compounds containing no anionic group and polyamine compounds containing no anionic group are preferred. The isocyanate-reactive compound (A1) can also be compounds each containing no anionic group and having a hydroxyl group and an amino group (a primary amino group or a secondary amino group). Each of these isocyanate-reactive compounds (A1) can be used alone or in combination.

Polyol compounds (A1) containing no anionic group (hereinafter may be referred to as "polyol(s) (A1)") as the isocyanate-reactive compounds (A1) include, for example, polyhydric alcohols, polyether polyols, polyester polyols, polycarbonate polyols, polyolefin polyols, polyacrylic polyols, and castor oil.

In the polyols (A1), the polyhydric alcohols include, but are not limited to, ethylene glycol, diethylene glycol, propylene glycol, dipropylene glycol, trimethylene glycol, 1,4-tetramethylenediol, 1,3-tetramethylenediol, 2-methyl-1,3-trimethylenediol, 1,5-pentamethylenediol, neopentyl glycol, 1,6-hexamethylenediol, 3-methyl-1,5-pentamethylenediol, 2,4-diethyl-1,5-pentamethylenediol, glycerol, trimethylolpropane, trimethylolethane, cyclohexanediols such as 1,4-cyclohexanediol, bisphenols such as bisphenol A, and sugar alcohols such as xylitol and sorbitol.

The polyether polyols include, but are not limited to, polyethylene glycol, polypropylene glycol, polytetramethylene glycol, and other polyalkylene glycols, as well as ethylene oxide-propylene oxide copolymers, and other copolymers each containing plural alkylene oxides, i.e., an alkylene oxide-another alkylene oxide copolymers.

The polyester polyols include, but are not limited to, polycondensation products between polyhydric alcohols and polycarboxylic acids; ring-opened polymers of cyclic esters (lactones); and reaction products among three components of polyhydric alcohols, polycarboxylic acids, and cyclic esters. In the polycondensation products, the polyhydric alcohols can be the aforementioned polyhydric alcohols. The polycarboxylic acids include, but are not limited to, malonic acid, maleic acid, succinic acid, glutaric acid, adipic acid, suberic acid, azelaic acid, sebacic acid, dodecanedioic acid, and other aliphatic dicarboxylic acids; 1,4-cyclohexanedicarboxylic acid, and other alicyclic dicarboxylic acids; terephthalic acid, isophthalic acid, orthophthalic acid, 2,6-naphthalenedicarboxylic acid, para-phenylenedicarboxylic acid, trimellitic acid, and other aromatic dicarboxylic acids. The cyclic esters in the ring-opened polymers include, for example, propiolactone, β-methyl-δ-valerolactone, and ε-caprolactone. The polyhydric alcohols, polycarboxylic acids, and cyclic esters in the reaction products of the three components include the aforementioned compounds.

The polycarbonate polyols include, but are not limited to, reaction products between polyhydric alcohols and phosgene; and ring-opened polymers of cyclic carbonic esters such as alkylene carbonates. More specifically, the polyhydric alcohols in the reaction products between the polyhydric alcohols and phosgene can be the aforementioned polyhydric alcohols. In the ring-opened polymers of cyclic carbonic esters, the alkylene carbonates include, for example, ethylene carbonate, trimethylene carbonate, tetramethylene carbonate, and hexamethylene carbonate. The polycarbonate polyols are not limited as long as they are compounds having a carbonate bond in their molecule and terminally having a hydroxyl group. These compounds may have an ester bond in addition to a carbonate bond.

The polyolefin polyols are polyols each containing an olefin as a component of a skeleton or principal chain of a polymer or copolymer and containing at least two hydroxyl groups in their molecule and preferably at their end. The olefin just mentioned above can be ethylene, propylene, other α-olefins, and other olefins each terminally having a carbon-carbon double bond at their end; isobutene, and other olefins having a carbon-carbon double bond in a portion other than the end; and butadiene, isoprene, and other dienes.

The polyacrylic polyols are polyols each containing a (meth)acrylate as a component of a skeleton or principal chain of a polymer or copolymer and containing at least two hydroxyl groups in their molecule. The (meth)acrylate is preferably any of (meth)acrylic alkyl esters such as methyl (meth)acrylate, ethyl (meth)acrylate, propyl (meth)acrylate, butyl (meth)acrylate, hexyl (meth)acrylate, octyl (meth)acrylate, 2-ethylhexyl (meth)acrylate, decyl (meth)acrylate, dodecyl (meth)acrylate, octadecyl (meth)acrylate, and other (meth)acrylic $C_1$-$C_{20}$ alkyl esters.

To introduce hydroxyl groups into the molecules of the polyolefin polyols and polyacrylic polyols, α,β-unsaturated compounds each having a hydroxyl group can be used as a comonomer with the olefin or (meth)acrylate. Such α,β-unsaturated compounds each having a hydroxyl group include, for example, 2-hydroxyethyl (meth)acrylate, 3-hydroxypropyl (meth)acrylate, and other (meth) acrylic hydroxyalkyl esters.

As the polyols (A1), polyether polyols, polyester polyols, and polycarbonate polyols can be advantageously used.

The polyamine compounds containing no anionic group and the polythiol compounds containing no anionic group as the isocyanate-reactive compounds (A1) include, for example, polyamine compounds containing no anionic group and polythiol compounds containing no anionic group corresponding to the polyol compounds (A1) containing no anionic group.

In the present invention, the combination use of an isocyanate-reactive compound (A1-1) having a number-average molecular weight of equal to or more than 500 and an isocyanate-reactive compound (A1-2) having a number-average molecular weight of less than 500 as the isocyanate-reactive compounds (A1) is especially preferred. By using the high-molecular-weight isocyanate-reactive compound (A1-1) in combination with the low-molecular-weight isocyanate-reactive compound (A1-2), the resulting water-based solid adhesive can bond adherends by contact bonding further satisfactorily.

The number-average molecular weight of the isocyanate-reactive compound (A1-1) having a number-average molecular weight of equal to or more than 500 (hereinafter may be referred to as "isocyanate-reactive compound (A1-1)") is not specifically limited in its upper limit, as long as it is equal to or more than 500, and is preferably in a range from 500 to 10000 and more preferably in a range from 500 to 3000.

When the isocyanate-reactive compound (A1-1) is, for example, a polyol compound (A1-1) containing no anionic group (hereinafter may be referred to as "polyol compound (A1-1)"), the isocyanate-reactive compound (A1-1) can be any of the polyol compounds (A1) containing no anionic group and having a number-average molecular weight of equal to or more than 500. More specifically, the polyol compounds (A1-1) as the isocyanate-reactive compounds (A1-1) include, for example, polyether polyols each having a number-average molecular weight of equal to or more than 500, polyester polyols each having a number-average molecular weight of equal to or more than 500, polycarbonate polyols each having a number-average molecular weight of equal to or more than 500, polyolefin polyols each having a number-average molecular weight of equal to or more than 500, and polyacrylic polyols each having a number-average molecular weight of equal to or more than 500, selected from among the aforementioned compounds.

The number-average molecular weight of the isocyanate-reactive compound (A1-2) having a number-average molecular weight of less than 500 (hereinafter may be referred to as "isocyanate-reactive compound (A1-2)") is not specifically limited in its lower limit, as long as it is less than 500, and is preferably in a range equal to or more than 48 and less than 500, and more preferably in a range equal to or more than 62 and ˆless than or equal to 300.

When the isocyanate-reactive compound (A1-2) is, for example, a polyol compound (A1-2) containing no anionic group (hereinafter may be referred to as "polyol compound (A1-2)"), the isocyanate-reactive compound (A1-2) can be any of the polyol compounds (A2) containing no anionic group and having a number-average molecular weight less than 500. More specifically, the polyol compounds (A1-2) as the isocyanate-reactive compounds (A1-2) include, for example, the polyhydric alcohols such as ethylene glycol, diethyleneglycol, propylene glycol, dipropylene glycol, trimethylene glycol, 1,4-tetramethylenediol, 1,3-tetramethylenediol, 2-methyl-1,3-trimethylenediol, 1,5-pentamethylenediol, neopentyl glycol, 1,6-hexamethylenediol, 3-methyl-1,5-pentamethylenediol, 2,4-diethyl-1,5-pentamethylenediol, glycerol, trimethylolpropane, trimethylolethane, cyclohexanediols such as 1,4-cyclohexanediol, bisphenols such as bisphenol A, and sugar alcohols such as xylitol and sorbitol; polyether polyols each having a number-average molecular weight less than 500; polyester polyols each having a number-average molecular weight less than 500; polycarbonate polyols each having a number-average molecular weight less than 500; polyolefin polyols each having a number-average molecular weight less than 500; and polyacrylic polyols each having a number-average molecular weight less than 500.

The isocyanate-reactive compound (A1-2) for use in the present invention can also be polyamine compounds (A1-2) each having a number-average molecular weight less than 500 and containing no anionic group (hereinafter may be referred to as "polyamine compound(s) (A1-2)"). Such polyamine compounds (A1-2) include, for example, aliphatic polyamines, alicyclic polyamines, aromatic polyamines, aromatic-aliphatic polyamines, hydrazine and derivatives thereof.

The aliphatic polyamines include, but are not limited to, ethylenediamine, 1,3-trimethylenediamine, 1,4-tetramethylenediamine, 1,3-pentamethylenediamine, 1,5-pentamethylenediamine, 1,6-hexamethylenediamine, 1,2-propylenediamine, 1,2-butylenediamine, 2,3-butylenediamine, 1,3-butylenediamine, 2-methyl-1,5-pentamethylenediamine, 3-methyl-1,5-pentamethylenediamine, 2,4,4-trimethyl-1,6-hexamethylenediamine, 2,2,4-trimethyl-1,6-hexamethylenediamine, and other aliphatic diamines, as well as diethylenetriamine, triethylenetetramine, tetraethylenepentamine, and pentaethylenehexamine.

The alicyclic polyamines include, but are not limited to, 1,3-cyclopentanediamine, 1,4-cyclohexanediamine, 1,3-cyclohexanediamine, 1-amino-3-aminomethyl-3,5,5-trimethylcyclohexane, 1-amino-1-methyl-4-aminomethylcyclohexane, 1-amino-1-methyl-3-aminomethylcyclohexane, 4,4'-methylenebis(cyclohexylamine), 4,4'-methylenebis(3-methyl-cyclohexylamine), methyl-2,3-cyclohexanediamine, methyl-2,4-cyclohexanediamine, methyl-2,6-cyclohexanediamine, 1,3-bis(aminomethyl)cyclohexane, 1,4-bis(aminomethyl)cyclohexane, isophoronediamine, norbornanediamine, and other alicyclic diamines.

The aromatic polyamines include, but are not limited to, m-phenylenediamine, p-phenylenediamine, 2,4-tolylenediamine, 2,6-tolylenediamine, naphthylene-1,4-diamine, naphthylene-1,5-diamine, 4,4'-diphenyldiamine, 4,4'-diphenylmethanediamine, 2,4'-diphenylmethanediamine, 4,4'-diphenyl ether diamine, 2-nitrodiphenyl-4,4'-diamine, 2,2'-diphenylpropane-4,4'-diamine, 3,3'-dimethyldiphenylmethane-4,4'-diamine, 4,4'-diphenylpropanediamine, 3,3'-dimethoxydiphenyl-4,4'-diamine, and other aromatic diamines.

The aromatic-aliphatic polyamines include, but are not limited to, 1,3-xylylenediamine, 1,4-xylylenediamine, α,α,α',α'-tetramethyl-1,3-xylylenediamine, α,α,α',α'-tetramethyl-1,4-xylylenediamine, ω,ω'-diamino-1,4-diethylbenzene, 1,3-bis(1-amino-1-methylethyl)benzene, 1,4-bis(1-amino-1-methylethyl)benzene, 1,3-bis(α,α-dimethylaminomethyl)benzene, and other aromatic-aliphatic diamines.

The hydrazine and derivatives thereof include, for example, hydrazine, and dihydrazide compounds. Such dihydrazide compounds include, but are not limited to, carbodihydrazide (carbohydrazide), oxalic acid dihydrazide, malonic acid dihydrazide, succinic acid dihydrazide, glutaric acid dihydrazide, adipic acid dihydrazide, and other aliphatic dicarboxylic acids dihydrazides; isophthalic acid dihydrazide, terephthalic acid dihydrazide, and other aromatic dicarboxylic acids dihydrazides; 1,4-cyclohexanedicarboxylic acid dihydrazide, and other alicyclic dicarboxylic acids dihydrazides.

Each of the isocyanate-reactive compounds (A1-2) and the isocyanate-reactive compounds (A1-2) can be used alone or in combination, respectively. For example, when a polyamine compound (A1-2) is used as the isocyanate-reactive compound (A1-2), a polyol compound (A1-2) can also be used in combination with the polyamine compound (A1-2). In this case, the ratio of the polyamine compound (A1-2) to the polyol compound (A1-2) is not specifically limited and can be appropriately set depending on, for example, the type of the target water-based solid adhesive.

The ratio of the isocyanate-reactive compound (A1-1) to the isocyanate-reactive compound (A1-2) is not specifically limited. To enable the water-based solid adhesive to perform contact bonding, the ratio is preferably such that the ratio of the isocyanate-reactive groups, such as hydroxyl groups, of the isocyanate-reactive compound (A1-1) to the isocyanate-reactive groups, such as hydroxyl groups, of the isocyanate-reactive compound (A1-2) is from about 0.05 to about 4.

[Compounds (A2) Having an Anionic Group and Plural Isocyanate-Reactive Groups]

The compound (A2) having an anionic group and plural isocyanate-reactive groups (hereinafter may be referred to as "isocyanate-reactive compound (A2)") is not specifically limited as long as it is a compound having at least one anionic group and at least two isocyanate-reactive groups in its molecule. The anionic group in the isocyanate-reactive compound (A2) is preferably carboxyl group and sulfo group, of which carboxyl group is especially preferred. The isocyanate-reactive groups in the isocyanate-reactive compound (A2) are not specifically limited, as long as they are groups having reactivity to isocyanate groups, and include, for example, hydroxyl group, primary amino group (unsubstituted amino group), secondary amino groups (mono-substituted amino groups), and mercapto group. The plural isocyanate-reactive groups may comprise one type of the isocyanate-reactive group or two or more types of the isocyanate-reactive groups in combination. As the isocyanate-reactive group for use in the present invention, hydroxyl group, primary amino group, and secondary amino groups are preferred, of which hydroxyl group is especially preferred. Accordingly, the isocyanate-reactive compound (A2) can be, for example, any of polyol compounds containing an anionic group, polyamine compounds containing an anionic group, and polythiol compounds containing an anionic group, of which polyol compounds containing an anionic group are preferred. The isocyanate-reactive compound (A2) can also be compounds each containing an anionic group and having a hydroxyl group and an amino group (a primary amino group or a secondary amino group). Each of these isocyanate-reactive compounds (A2) can be used alone or in combination.

Polyol compounds (A2) containing an anionic group (hereinafter may be referred to as "polyol(s) (A2)") as the isocyanate-reactive compounds (A2) include, for example, polyols containing a carboxyl group corresponding to the polyols exemplified in the polyols (A1) except with an introduced carboxyl group. The polyols (A2) for use in the present invention are preferably polyols having an anionic group and having a low molecular weight, of which polyhydroxycarboxylic acids represented by following Formula (4) are especially preferred.

$$(HO)_X L(COOH)_Y \quad (4)$$

In Formula (4), L is a hydrocarbon moiety containing 1 to 12 carbon atoms; X is an integer equal to or more than 2; and Y is an integer equal to or more than 1.

In Formula (4), the hydrocarbon moiety L is preferably an aliphatic hydrocarbon moiety and may be a straight or branched chain. X and Y may be the same or different. The two or more hydroxyl groups may be combined with the same carbon atom or with different carbon atoms. When Y is equal to or more than 2, the two or more carboxyl groups may be combined with the same carbon atom or with different carbon atoms.

Of these polyhydroxycarboxylic acids, dimethylolalkanoic acids are preferred, of which 2,2-dimethylolalkanoic acids are especially preferred. Such dimethylolalkanoic acids include, but are not limited to, 2,2-dimethylolpropionic acid, 2,2-dimethylolbutanoic acid, 2,2-dimethylolpentanoic acid, 2,2-dimethylolhexanoic acid, 2,2-dimethylolheptanoic acid, 2,2-dimethylolactanoic acid, 2,2-dimethylolnonanoicacid, and 2,2-dimethyloldecanoic acid.

The anionic-group-containing polyamine compounds and anionic-group-containing polythiol compounds as the isocyanate-reactive compounds (A2) include anionic-group-containing polyamine compounds corresponding to the anionic-group-containing polyol compounds (A2), such as polyaminecarboxylic acids corresponding to the polyhydroxycarboxylic acids represented by Formula (4), and anionic-group-containing polythiol compounds corresponding to the anionic-group-containing polyol compounds (A2), such as polythiolcarboxylic acids corresponding to the polyhydroxycarboxylic acids represented by Formula (4).

[Polyisocyanate Compounds (A3)]

The polyisocyanate compound (A3) (hereinafter may be referred to as "polyisocyanate(s) (A3)") is not specifically limited as long as it is a compound having at least two isocyanate groups in its molecule. Such polyisocyanates (A3) include, for example, aliphatic polyisocyanates, alicyclic polyisocyanates, aromatic polyisocyanates, and aromatic-aliphatic polyisocyanates. Each of these polyisocyanates (A3) can be used alone or in combination.

The aliphatic polyisocyanates include, but are not limited to, 1,3-trimethylene diisocyanate, 1,4-tetramethylene diisocyanate, 1,3-pentamethylene diisocyanate, 1,5-pentamethylene diisocyanate, 1,6-hexamethylene diisocyanate, 1,2-propylene diisocyanate, 1,2-butylene diisocyanate, 2,3-butylene diisocyanate, 1,3-butylene diisocyanate, 2-methyl-1,5-pentamethylene diisocyanate, 3-methyl-1,5-pentamethylene diisocyanate, 2,4,4-trimethyl-1,6-hexamethylene diisocyanate, 2,2,4-trimethyl-1,6-hexamethylene diisocyanate, 2,6-diisocyanate methyl caproate, lysine diisocyanate, and other aliphatic diisocyanates.

The alicyclic polyisocyanates include, but are not limited to, 1,3-cyclopentane diisocyanate, 1,4-cyclohexane diisocyanate, 1,3-cyclohexane diisocyanate, 3-isocyanatomethyl-3,5,5-trimethylcyclohexyl isocyanate, 4,4'-methylenebis(cyclohexyl isocyanate), methyl-2,4-cyclohexane diisocyanate, methyl-2,6-cyclohexane diisocyanate, 1,3-bis(isocyanatomethyl)cyclohexane, 1,4-bis(isocyanatomethyl)cyclohexane, isophorone diisocyanate, norbornane diisocyanate, and other alicyclic diisocyanates.

The aromatic polyisocyanates include, but are not limited to, m-phenylene diisocyanate, p-phenylene diisocyanate, 2,4-tolylene diisocyanate, 2,6-tolylene diisocyanate, naphthylene-1,4-diisocyanate, naphthylene-1,5-diisocyanate, 4,4'-diphenyl diisocyanate, 4,4'-diphenylmethane diisocyanate, 2,4'-diphenylmethane diisocyanate, 4,4'-diphenyl ether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, 3,3'-dimethoxydiphenyl-4,4'-diisocyanate, and other aromatic diisocyanates.

The aromatic-aliphatic polyisocyanates include, but are not limited to, 1,3-xylylene diisocyanate, 1,4-xylylene diisocyanate, ω,ω'-diisocyanato-1,4-diethylbenzene, 1,3-bis(1-isocyanato-1-methylethyl)benzene, 1,4-bis(1-isocyanato-1-methylethyl)benzene, 1,3-bis(α,α-dimethylisocyanatomethyl)benzene, and other aromatic-aliphatic diisocyanates.

Preferred examples of the polyisocyanates (A3) are 1,6-cyclohexane diisocyanate, 4,4'-methylenebis(cyclohexyl isocyanate), 1,3-bis(isocyanatomethyl)cyclohexane, 1,4-bis(isocyanatomethyl)cyclohexane, isophorone diisocyanate, 2,4-tolylene diisocyanate, 2,6-tolylene diisocyanate, 4,4'-diphenylmethane diisocyanate, 1,3-xylylene diisocyanate, 1,4-xylylene diisocyanate, norbornane diisocyanate, and 1,3-bis(α,α-dimethylisocyanatomethyl)benzene. By using any of the aliphatic polyisocyanates and aromatic-aliphatic polyisocyanates as the polyisocyanate (A3), resins with less discoloration can be obtained.

The polyisocyanates (A3) for use in the present invention also include dimers, trimers, reaction products, and polymers derived from the aforementioned aliphatic polyisocyanates, alicyclic polyisocyanates, aromatic polyisocyanates, and aromatic-aliphatic polyisocyanates. Such compounds include, for example, dimers and trimers of diphenylmethane diisocyanate, reaction products of trimethylolpropane with tolylene diisocyanate, reaction products of trimethylolpropane with hexamethylene diisocyanate, polymethylene polyphenyl isocyanates, polyether polyisocyanates, and polyester polyisocyanates.

Diisothiocyanate compounds, such as phenyl diisothiocyanate, can be used in combination with the polyisocyanates (A3) in the present invention.

[Alkoxysilane Compounds (A4) Containing an Isocyanate-Reactive Group]

The alkoxysilane compound (A4) containing an isocyanate-reactive group (hereinafter may be referred to as "alkoxysilane(s) (A4) containing an isocyanate-reactive group") is not specifically limited as long as it is a silane compound having at least one isocyanate-reactive group and at least one alkoxy group in its molecule. Each of these alkoxysilanes (A4) containing an isocyanate-reactive group can be used alone or in combination.

The isocyanate-reactive group is not specifically limited as long as it is a group having reactivity to isocyanate groups and includes, for example, primary amino group (unsubstituted amino group), secondary amino groups (mono-substituted amino groups), mercapto group, isocyanate group, and hydroxyl group, of which primary or secondary amino groups and mercapto group are preferred. When the alkoxysilane (A4) has plural isocyanate-reactive groups, the plural isocyanate-reactive groups may comprise one type of isocyanate-reactive group or two or more types of isocyanate-reactive groups in combination.

Preferred examples of the alkoxysilanes (A4) containing an isocyanate-reactive group for use in the present invention are alkoxysilane compounds (A4-1) each containing a primary or secondary amino group, and alkoxysilane compounds (A4-2) each containing a mercapto group.

The alkoxysilane compounds (A4-1) each containing a primary or secondary amino group (hereinafter may be referred to as "amino-group-containing alkoxysilane(s) (A4-1)") are not specifically limited, as long as they are silane compounds each having at least one primary or secondary amino group and at least one alkoxy group in their molecule. The amino-group-containing alkoxysilanes (A4-1) can each have one or more tertiary amino groups as amino groups. The alkoxysilane compounds (A4-2) each containing a mercapto group (hereinafter may be referred to as "mercapto-group-containing alkoxysilane(s) (A4-2)") are not specifically limited as long as they are silane compounds each having at least one mercapto group and at least one alkoxy group in their molecule.

Preferred examples of the alkoxy group in the alkoxysilanes (A4) containing an isocyanate-reactive group are methoxy group, ethoxy group, propoxy group, isopropoxy group, butoxy group, isobutyloxy group, s-butyloxy group, t-butyloxy group, and other $C_1$-$C_4$ alkoxy groups, of which methoxy group, ethoxy group, and propoxy group are more preferred. Among them, methoxy group and ethoxy group are especially preferred. The alkoxy groups are generally combined with silicon atoms of the alkoxysilane (A4) containing an isocyanate-reactive group, and the number of the alkoxy groups is generally from one to three, and preferably two or three. Each of these alkoxy groups can be used alone or in combination. Namely, the alkoxysilane (A4) containing an isocyanate-reactive group may have the same alkoxy group or may have two or more different alkoxy groups combined with its silicon atom.

When the isocyanate-reactive groups are amino groups, secondary amino groups or tertiary amino groups may be constituted by having a substituent such as a hydrocarbon group. Such hydrocarbon groups include, for example, phenyl group and other aryl groups; methyl group, ethyl group, propyl group, butyl group, and other alkyl groups; cyclohexyl groups and other cycloalkyl groups. The hydrocarbon group may have another substituent. Such substituents include, for example, alkoxy groups, aryloxy groups, cycloalkyloxy groups, alkoxycarbonyl groups, aryloxycarbonyl groups, cycloalkyloxycarbonyl groups, and acyl groups.

The isocyanate-reactive groups such as primary amino group, secondary amino groups, or mercapto group may be directly combined with a silicon atom but are preferably combined with a silicon atom through a divalent group. Such divalent groups include, but are not limited to, alkylene groups, arylene groups, alkylene-arylene groups, alkylene-arylene-alkylene groups, and other divalent hydrocarbon groups each comprising hydrocarbon group(s) alone; alkylene-oxy-alkylene groups, alkylene-carbonyl-oxy-alkylene groups, alkylene-oxy-carbonyl-alkylene groups, alkylene-poly(oxyalkylene) groups, and other divalent groups each comprising a hydrocarbon group in combination with another group such as oxy group and carbonyl-oxy group.

When the alkoxysilane (A4) containing an isocyanate-reactive group is, for example, an amino-group-containing alkoxysilane (A4-1), the amino group may be in the form of an aminoalkyl group. Such aminoalkyl groups include, but are not limited to, aminomethyl group, 1-aminoethyl group, 2-aminoethyl group, 1-aminopropyl group, 2-aminopropyl group, 3-aminopropyl group, and other amino-$C_1$-$C_3$ alkyl groups, corresponding secondary amino groups such as amino-$C_1$-$C_3$ alkyl groups which amino group has one hydrocarbon group as a substituent, and tertiary amino groups such as amino-$C_1$-$C_3$ alkyl groups which amino group has two hydrocarbon groups as substituents. The hydrocarbon groups and other substituents substituted on nitrogen atoms in the secondary amino groups and tertiary amino groups may each have another amino group, and the amino group just mentioned above may also have a substituent such as a hydrocarbon group. Namely, the aminoalkyl groups can be N-aminoalkyl-aminoalkyl groups and N—[N-(aminoalkyl)aminoalkyl]aminoalkyl groups. These compounds may have a secondary amino group in addition to a primary amino group. The number of the primary or secondary amino group(s) is not specifically limited and is generally one or two. Thus, preferred examples of the amino-group-containing alkoxysilanes (A4-1) are amino-group-containing alkoxysilanes each having at least one secondary amino group, wherein these alkoxysilanes preferably contain no primary amino group when they each contain one secondary amino group, such as compounds represented by following Formula (5c).

More specifically, preferred examples of the amino-group-containing alkoxysilanes (A4-1) as the alkoxysilanes (A4) containing an isocyanate-reactive group are amino-group-containing alkoxysilanes represented by following Formula (5a) each having a primary amino group alone as the isocyanate-reactive group, amino-group-containing alkoxysilanes represented by following Formula (5b) each having a primary amino group and a secondary amino group as the isocyanate-reactive group, and amino-group-containing alkoxysilanes represented by following Formula (5c) each having a secondary amino group alone as the isocyanate-reactive group. Preferred examples of the mercapto-group-containing alkoxysilanes (A4-2) as the alkoxysilanes (A4) containing an isocyanate-reactive group are mercapto-group-containing alkoxysilanes represented by following Formula (5d) each having a mercapto group alone as the isocyanate-reactive group.

(5a)

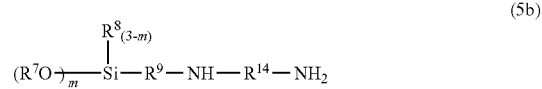

(5b)

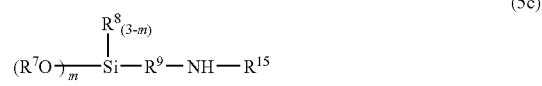

(5c)

(5d)

In Formulae (5a), (5b), (5c), and (5d), $R^7$ and $R^8$ are the same or different and are each an alkyl group; $R^9$ and $R^{14}$ are each an alkylene group; $R^{15}$ is an aryl group, an alkyl group or a cycloalkyl group; and m is an integer from 1 to 3, wherein the alkylene groups $R^9$ and $R^{14}$ in Formula (5b) may be the same or different.

In Formulae (5a), (5b), (5c), and (5d), preferred alkyl groups as $R^7$ are, for example, methyl group, ethyl group, propyl group, isopropyl group, butyl group, isobutyl group, t-butyl group, and other alkyl groups each containing about 1 to about 4 carbon atoms. The alkyl group as $R^8$ can be similar alkyl groups as $R^7$, of which methyl group and ethyl group are preferred. The alkylene group as $R^9$ is preferably methylene group, ethylene group, trimethylene group, and other alkylene groups each containing about 1 to about 3 carbon atoms. The alkylene group as $R^{14}$ can be any of alkylene groups each containing about 1 to about 3 carbon atoms, as in the alkylene group as $R^9$. In $R^{15}$, the aryl group is preferably phenyl group; the alkyl group is preferably methyl group, ethyl group, propyl group, isopropyl group, butyl group, isobutyl group, t-butyl group, and other alkyl groups each containing about 1 to about 4 carbon atoms; and the cycloalkyl group is preferably cyclohexyl group. The number m is an integer from 1 to 3.

Examples of the amino-group-containing alkoxysilanes represented by Formula (5a) each having a primary amino group alone as the isocyanate-reactive group are aminomethyltrimethoxysilane, aminomethyltriethoxysilane, β-aminoethyltrimethoxysilane, β-aminoethyltriethoxysilane, γ-aminopropyltrimethoxysilane, γ-aminopropyltriethoxysilane, γ-aminopropyltripropoxysilane, γ-aminopropyltriisopropoxysilane, γ-aminopropyltributoxysilane, and other aminoalkyltrialkoxysilanes; β-aminoethylmethyldimethoxysilane, β-aminoethylmethyldiethoxysilane, γ-aminopropylmethyldimethoxysilane, γ-aminopropylmethyldiethoxysilane, γ-aminopropylmethyldipropoxysilane, and other (aminoalkyl)alkyldialkoxysilanes, and corresponding aminoalkyldialkyl(mono)alkoxysilanes.

Examples of the amino-group-containing alkoxysilanes represented by Formula (5b) each having a primary amino group and a secondary amino group as the isocyanate-reactive group are N-β(aminoethyl)-γ-aminopropyltrimethoxysilane, N-β(aminoethyl)-γ-aminopropyltriethoxysilane, and other N-(aminoalkyl)aminoalkyltrialkoxysilanes; N-β(aminoethyl)-γ-aminopropylmethyldimethoxysilane, N-β(aminoethyl)-γ-aminopropylmethyldiethoxysilane, and other N-(aminoalkyl)aminoalkylalkyldialkoxysilanes.

Examples of the amino-group-containing alkoxysilanes represented by Formula (5c) each having a secondary amino group alone as the isocyanate-reactive group are N-phenyl-β-aminoethyltrimethoxysilane, N-phenyl-β-aminoethyltriethoxysilane, and other N-phenyl-β-aminoethyltrialkoxysilanes; N-phenyl-γ-aminopropyltrimethoxysilane, N-phenyl-γ-aminopropyltriethoxysilane, N-phenyl-γ-aminopropyltripropoxysilane, N-phenyl-γ-aminopropyltributoxysilane, and other N-phenyl-γ-aminopropyltrialkoxysilanes, N-phenylaminoalkyl(mono- or di-)alkyl(di- or mono-)alkoxysilanes corresponding to these alkoxysilanes, as well as N-alkylaminoalkyltrialkoxysilanes corresponding to the amino-group-containing alkoxysilanes containing a secondary amino group with a phenyl group as a substituent, such as N-methyl-3-aminopropyltrimethoxysilane, N-ethyl-3-aminopropyltrimethoxysilane, N-n-propyl-3-aminopropyltrimethoxysilane, N-n-butyl-aminomethyltrimethoxysilane, N-n-butyl-2-aminoethyltrimethoxysilane, N-n-butyl-3-aminopropyltrimethoxysilane, N-n-butyl-3-aminopropyltriethoxysilane, and N-n-butyl-3-aminopropyltripropoxysilane, as well as corresponding N-alkylaminoalkyl(mono- or di-)alkyl(di- or mono-)alkoxysilanes.

The amino-group-containing alkoxysilanes (A4-1) for use in the present invention are also commercially available under the trade names of "KBM 6063", "X-12-896", "KBM 576", "X-12-565", "X-12-580", "X-12-5263", "X-12-666", "KBM 6123", "X-12-575", "X-12-577", "X-12-563B", "X-12-730", "X-12-562", "X-12-5202", "X-12-5204", and "KBE 9703" from Shin-Etsu Chemical Co., Ltd. The amino-group-containing alkoxysilanes (A4-1) therefore also include N-(5-aminopentyl)-γ-aminopropyltrimethoxysilane, N-β[N-β (aminoethyl)aminoethyl]-γ-aminopropyltrimethoxysilane, 1,2-bis(γ-trimethoxysilyl-propylamino)ethane, bis(γ-trimethoxysilyl-propyl) amine, N-β(aminoethyl)-β(4-aminomethylphenyl)ethyltrimethoxysilane, and corresponding alkoxysilane compounds each having a hydrocarbon group such as an alkyl group or an alkylene group containing a different number of carbon atoms; alkoxysilane compounds each having another group such as a styrenically unsaturated group, an olefinically unsaturated group, or a carboxyl group in addition to a primary or secondary amino group; alkoxysilane compounds in the form of a salt, such as a hydrochloride, having a primary or secondary amino group; and alkoxysilane compounds each having plural alkoxysilyl groups in addition to a primary or secondary amino group.

Examples of the mercapto-group-containing alkoxysilanes represented by Formula (5d) each having a mercapto group alone as the isocyanate-reactive group are mercaptomethyltrimethoxysilane, mercaptomethyltriethoxysilane, β-mercaptoethyltrimethoxysilane, β-mercaptoethyltriethoxysilane, γ-mercaptopropyltrimethoxysilane, γ-mercaptopropyltriethoxysilane, γ-mercaptopropyltripropoxysilane, γ-mercaptopropyltriisopropoxysilane, γ-mercaptopropyltributoxysilane, and other mercaptoalkyltrialkoxysilanes; β-mercaptoethylmethyldimethoxysilane, β-mercaptoethylmethyldiethoxysilane, γ-mercaptopropylmethyldimethoxysilane, γ-mercaptopropylmethyldiethoxysilane, γ-mercaptopropylmethyldipropoxysilane, other (mercaptoalkyl)alkyldialkoxysilanes, and corresponding mercaptoalkyldialkyl(mono)alkoxysilanes.

The amino-group-containing alkoxysilanes (A4-1) are preferably used as the isocyanate-reactive group-containing alkoxysilanes (A4) for their easy reactions and commercial availability. Among such amino-group-containing alkoxysilanes (A4-1), preferred amino-group-containing alkoxysilanes having at least a primary amino group (e.g., a primary amino group alone or a primary amino group and a secondary amino group) as the isocyanate-reactive group are, for example, N-β-aminoethyl-γ-aminopropyltrimethoxysilane, N-β(aminoethyl)-γ-aminopropyltriethoxysilane, N-β(aminoethyl)-γ-aminorpopylmethyldimethoxysilane, and γ-aminopropyltrimethoxysilane. Preferred amino-group-containing alkoxysilanes having a secondary amino group alone as the isocyanate-reactive group are, for example, N-phenylγ-aminopropyltrimethoxysilane, and N-n-butyl-3-aminopropyltrimethoxysilane.

The amino-group-containing alkoxysilanes (A4-1) can also be alkoxysilane compounds having at least a secondary amino group as the isocyanate-reactive group obtained in the following manner (hereinafter may be referred to as "ester-modified amino-group-containing alkoxysilanes (A4-5)"). These ester-modified amino-group-containing alkoxysilanes (A4-5) are obtained as a result of a reaction between an alkoxysilane compound having at least a primary amino group, preferably both primary and secondary amino groups, as the isocyanate-reactive group (hereinafter may be referred to as "primary amino group-containing alkoxysilane") as mentioned above and an unsaturated carboxylic ester (A5). Such unsaturated carboxylic esters (A5) for use in the preparation of the ester-modified amino-group-containing alkoxysilanes (A4-5) are not specifically limited as long as they are compounds in which at least one of, and preferably all of, the carboxylic acid groups (carboxyl groups) of an unsaturated carboxylic acid forms an ester. The unsaturated carboxylic esters (A5) can be any of unsaturated monocarboxylic esters and unsaturated polycarboxylic esters such as unsaturated dicarboxylic esters. Each of these unsaturated carboxylic esters (A5) can be used alone or in combination.

Preferred examples of the unsaturated carboxylic esters (A5) are compounds each having a carboxyl group or its ester directly combined with a carbon atom constituting a carbon-carbon double bond. Such esters of carboxyl group include, for example, alkoxycarbonyl groups, cycloalkyloxycarbonyl groups, and aryloxycarbonyl groups. Such compounds include, for example, acrylic esters, methacrylic esters, crotonic esters, isocrotonic esters, 2-butenoic esters, 3-methyl-2-butenoic esters, 2-pentenoic esters, 2-octenoic esters, cinnamic esters, and other esters of unsaturated monocarboxylic acids; maleic esters (mono- or di-esters), fumaric esters (mono- or di-esters), itaconic esters (mono- or di-esters), and other esters of unsaturated dicarboxylic acids.

The ester moieties in the unsaturated carboxylic esters (A5) include, but are not limited to, methyl esters, ethyl esters, propyl esters, isopropyl esters, butyl esters, isobutyl esters, s-butyl esters, t-butyl esters, pentyl esters, isopentyl esters, hexyl esters, heptyl esters, octyl esters, 2-ethylhexyl esters, nonyl esters, decyl esters, isodecyl esters, undecyl esters, dodecyl esters, tridecyl esters, tetradecyl esters, hexadecyl esters, octadecyl esters, and other aliphatic hydrocarbon esters such as alkyl esters; cyclohexyl esters, isobornyl esters, bornyl esters, dicyclopentadienyl esters, dicyclopentanyl esters, dicyclopentenyl esters, tricyclodecanyl esters, and other alicyclic hydrocarbon esters such as cycloalkyl esters; phenyl esters, benzyl esters, and other aromatic hydrocarbon esters such as aryl esters. When the unsaturated carboxylic esters each have plural ester moieties, these ester moieties may be the same or different.

Among these unsaturated carboxylic esters, acrylic esters, methacrylic esters (hereinafter may be generically referred to as "(meth)acrylic esters"), and maleic diesters are preferred as the unsaturated carboxylic esters (A5). Such (meth) acrylic esters include, but are not limited to, methyl (meth)acrylate, ethyl (meth)acrylate, butyl (meth)acrylate, hexyl (meth)acrylate, octyl (meth)acrylate, 2-ethylhexyl (meth)acrylate, dodecyl (meth)acrylate, octadecyl (meth)acrylate, and other (meth)acrylic alkyl esters. The maleic diesters include, but are not limited to, dimethyl maleate, diethyl maleate, dibutyl maleate, dihexyl maleate, dioctyl maleate, di(2-ethylhexyl) maleate, didodecyl maleate, dioctadecyl maleate, and other maleic dialkyl esters.

More specifically, the alkoxysilane compounds each having at least a secondary amino group as the isocyanate-reactive group and being obtained as a result of a primary amino group-containing alkoxysilane and an unsaturated carboxylic ester (A5), i.e., the ester-modified amino-group-containing alkoxysilanes (A4-5) include, for example, compounds in which a carbon atom at the β-position in a carbon-carbon double bond of the unsaturated carboxylic ester (A5) is combined with at least a nitrogen atom of the amino group in the primary amino group-containing alkoxysilane. Namely, the ester-modified amino-group-containing alkoxysilanes (A4-5) are compounds obtained as a result of a Michael addition reaction of the nitrogen atom of the amino group in the primary amino group-containing alkoxysilane to the unsaturated bond (carbon-carbon double bond) of the unsaturated carboxylic ester (A5). The reaction can be performed in the presence of, or in the absence of, a solvent. The reaction may be performed with heating and/or with the application of pressure.

When the primary amino group-containing alkoxysilane is, for example, an alkoxysilane compound represented by Formula (5a) having a primary amino group alone as the isocyanate-reactive group, and the unsaturated carboxylic ester (A5) is an unsaturated carboxylic ester represented by following Formula (6), the ester-modified amino-group-containing alkoxysilanes (A4-5) can be represented by following Formula (3d):

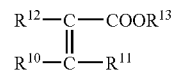
(6)

wherein $R^{10}$ and $R^{12}$ are the same or different and are each a hydrogen atom or an alkyl group; $R^{11}$ is a hydrogen atom, an alkyl group, an aryl group, an alkoxycarbonyl group, an aryloxycarbonyl group, or a cycloalkyloxycarbonyl group; and $R^{13}$ is an alkyl group, an aryl group or a cycloalkyl group:

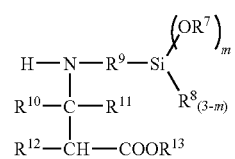
(3d)

wherein $R^7$, $R^8$, $R^9$, $R^{10}$, $R^{11}$, $R^{12}$, $R^{13}$, and m have the same meanings as defined above.

The ester-modified amino-group-containing alkoxysilanes (A4-5) represented by Formula (3d) each have only one secondary amino group as the amino group. In the ester-modified amino-group-containing alkoxysilanes (A4-5) represented by Formula (3d), $R^{11}$ is preferably a hydrogen atom or an alkyl group. Specifically, preferred ester-modified amino-group-containing alkoxysilanes (A4-5) represented by Formula (3d) are ester-modified amino-group-containing alkoxysilanes (A4-5) represented by following Formula (3a):

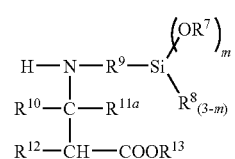
(3a)

wherein $R^7$, $R^8$, $R^9$, $R^{10}$, $R^{12}$, $R^{13}$, and m have the same meanings as defined above; and $R^{11a}$ is a hydrogen atom or an alkyl group.

When the primary amino group-containing alkoxysilane is an alkoxysilane compound represented by Formula (5b) having a primary and secondary amino groups as the isocyanate-reactive group, and the unsaturated carboxylic ester (A5) is the unsaturated carboxylic ester represented by Formula (6), the ester-modified amino-group-containing alkoxysilanes (A4-5) can be represented by following Formula (3b) or (3c):

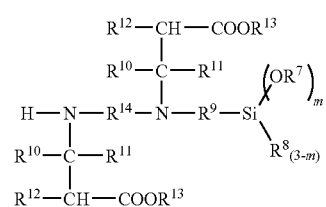
(3b)

wherein $R^7, R^8, R^9, R^{10}, R^{11}, R^{12}, R^{13}, R^{14}$, and m have the same meanings as defined above:

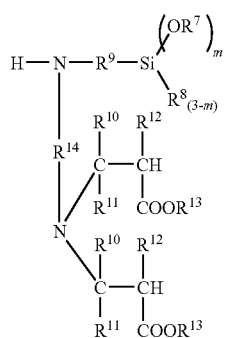
(3c)

wherein $R^7, R^8, R^9, R^{10}, R^{11}, R^{12}, R^{13}, R^{14}$ and m have the same meanings as defined above.

These ester-modified amino-group-containing alkoxysilanes (A4-5) represented by Formula (3b) or (3c) each have one secondary amino group and one tertiary amino group as the amino groups.

In Formulae (3a), (3b), (3c), (3d), and (6), $R^7, R^8, R^9, R^{10}, R^{11}, R^{12}, R^{13}, R^{14}$, and m have the same meanings as defined above. Specifically, preferred alkyl groups as $R^7$ are, for example, methyl group, ethyl group, propyl group, isopropyl group, butyl group, isobutyl group, t-butyl group, and other alkyl groups each containing about 1 to about 4 carbon atoms. The alkyl group as $R^8$ can be similar alkyl groups as $R^7$, of which methyl group and ethyl group are preferred. The alkylene group as $R^9$ is preferably methylene group, ethylene group, trimethylene group, and other alkylene groups each containing about 1 to about 3 carbon atoms. The alkylene group as $R^{14}$ can be any of alkylene groups each containing about 1 to about 3 carbon atoms, as in the alkylene group as $R^9$. The number m is an integer from 1 to 3.

The alkyl group as $R^{10}$ includes, but is not limited to, methyl group, ethyl group, propyl group, butyl group, isobutyl group, t-butyl group, hexyl group, and other alkyl groups each containing about 1 to about 6 carbon atoms. The alkyl group as $R^{11}$ includes, for example, methyl group, ethyl group, and other alkyl groups each containing about 1 or 2 carbon atoms. The aryl group as $R^{11}$ includes phenyl group. In the alkoxycarbonyl group, aryloxycarbonyl group, and cycloalkyloxycarbonyl group as $R^{11}$, the alkyl group moiety, aryl group moiety, and cycloalkyl group moiety are preferably alkyl groups, aryl groups, and cycloalkyl groups exemplified in $R^{13}$ mentioned later. The alkyl group as $R^{12}$ includes, for example, methyl group, ethyl group, and other alkyl groups each containing about 1 or 2 carbon atoms. The alkyl group as $R^{13}$ includes, but is not limited, methyl group, ethyl group, propyl group, butyl group, isobutyl group, t-butyl group, hexyl group, octyl group, 2-ethylhexyl group, and other alkyl groups each containing about 1 to about 20 carbon atoms. The aryl group as $R^{13}$ includes phenyl group, and the cycloalkyl group as $R^{13}$ includes, for example, cyclohexyl group.

The substituent $R^{11a}$ corresponds to the cases where $R^{11}$ is a hydrogen atom or an alkyl group. The alkyl group as $R^{11a}$ can be selected from the aforementioned alkyl groups exemplified as $R^{11}$.

Preferred amino-group-containing alkoxysilanes (A4-1) for use in the present invention are alkoxysilane compounds having at least a secondary amino group (mono-substituted amino group), of which ester-modified alkoxysilanes (A4-5) represented by Formula (3a), (3b) or (3c) are especially preferred.

[Anionic-Group-Containing Polymers (A) Terminally Having an Alkoxysilyl Group]

The anionic-group-containing polymer (A) terminally having an alkoxysilyl group is a reaction product among the isocyanate-reactive compound (A1), the isocyanate-reactive compound (A2), the polyisocyanate (A3), and the alkoxysilane compound (A4) containing an isocyanate-reactive group, as mentioned above. The polymer (A) has, in its molecule, an anionic group derived from the isocyanate reactive compound (A2) and, at the end of its principal chain, an alkoxysilyl group derived from the alkoxysilane (A4) containing an isocyanate-reactive group. The anionic-group-containing polymer (A) terminally having an alkoxysilyl group may have a side chain derived from the unsaturated carboxylic ester according to necessity. The anionic-group-containing polymer (A) terminally having an alkoxysilyl group can be, for example, an anionic-group-containing polymer having an alkoxysilylated end obtained as a result of a reaction between an anionic-group-containing polymer and the alkoxysilane (A4) containing an isocyanate-reactive group, which anionic-group-containing polymer is a reaction product among the isocyanate-reactive compound (A1), the isocyanate-reactive compound (A2), and the polyisocyanate (A3). Preferred examples of such anionic-group-containing polymer (A) having an alkoxysilylated end obtained as a result of a reaction between an anionic-group-containing polymer and the alkoxysilane (A4) containing an isocyanate-reactive group, which anionic-group-containing polymer is a reaction product among the isocyanate-reactive compound (A1), the isocyanate-reactive compound (A2), and the polyisocyanate (A3), are anionic-group-containing polymers represented by following Formula (2) terminally having an alkoxysilyl group:

(2)

wherein W is a residue corresponding to a skeleton of an anionic-group-containing polymer; the nitrogen atom combined with W is a nitrogen atom derived from an isocyanate group at the end of the anionic-group-containing polymer; W has a structural unit represented by following Formula (2a):

(2a)

wherein Y is one of a residue derived from the compound (A1) containing no anionic group and having plural isocyanate-reactive groups and a residue derived from the compound (A2) having an anionic group and plural isocyanate-reactive groups; V combined with Y is a group derived from one of isocyanate-reactive groups of the compound (A1) and the compound (A2), wherein both the residue derived from the compound (A1) and the residue derived from the compound (A2) as Y are contained in the polymer; Z is a residue derived from the polyisocyanate compound (A3), wherein a nitrogen atom combined with Z and a nitrogen atom on the opposite side to Z are nitrogen atoms derived from isocyanate groups of the polyisocyanate compound (A3);

X is an alkoxysilyl-containing group represented by any one of following Formulae (2b), (2c), and (2d):

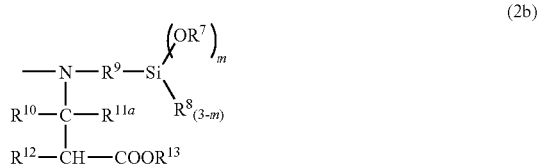
(2b)

wherein $R^7$ and $R^8$ are the same or different and are each an alkyl group; $R^9$ is an alkylene group; $R^{10}$ and $R^{12}$ are the same or different and are each a hydrogen atom or an alkyl group; $R^{11a}$ is a hydrogen atom or an alkyl group; $R^{13}$ is an alkyl group, an aryl group or a cycloalkyl group; and m is an integer from 1 to 3:

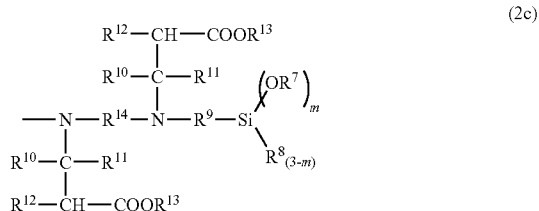
(2c)

wherein $R^7$ and $R^8$ are the same or different and are each an alkyl group; $R^9$ and $R^{14}$ are the same or different and are each an alkylene group; $R^{10}$ and $R^{12}$ are the same or different and are each a hydrogen atom or an alkyl group; $R^{11}$ is a hydrogen atom, an alkyl group, an aryl group, an alkoxycarbonyl group, an aryloxycarbonyl group, or a cycloalkyloxycarbonyl group; $R^{13}$ is an alkyl group, an aryl group, or a cycloalkyl group; and m is an integer from 1 to 3:

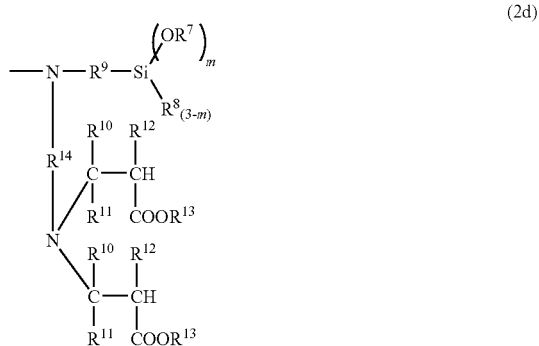
(2d)

wherein $R^7$, $R^8$, $R^9$, $R^{10}$, $R^{11}$, $R^{12}$, $R^{13}$, $R^{14}$, and m have the same meanings as defined above; and n is an integer from 1 to 4.

Preferred examples of the anionic-group-containing polymers (A) terminally having an alkoxysilyl group for use in the present invention are anionic-group-containing polymers having an alkoxysilylated end and being obtained as a result of a reaction between an anionic-group-containing polymer and the alkoxysilane (A4) containing an isocyanate-reactive group, which anionic-group-containing polymer is a reaction product among the polyol (A1) as the isocyanate-reactive compound (A1), the polyol (A2) as the isocyanate-reactive compound (A2), and the polyisocyanate (A3). Namely, it is preferred in Formula (2a) that Y is one of a residue derived from the polyol compound (A1) containing no anionic group and a residue derived from the polyol compound (A2) containing an anionic group; and V combined with Y is an oxygen atom derived from a hydroxyl group of the polyol compound (A1) containing no anionic group or a hydroxyl group of the polyol compound (A2) containing an anionic group, wherein both the residue derived from the polyol compound (A1) and the residue derived from the polyol compound (A2) are contained in the polymer.

Specifically, preferred examples of the anionic-group-containing polymers having an alkoxysilylated end as the anionic-group-containing polymers (A) terminally having an alkoxysilyl group are anionic-group-containing polymers represented by following Formula (7) having an alkoxysilyl group at the end, which anionic-group-containing polymers (A) terminally having an alkoxysilyl group are obtained as a result of, for example, a reaction between an anionic-group-containing polymer and the ester-modified amino group-containing alkoxysilane (A4-5) as the alkoxysilane (A4) containing an isocyanate-reactive group, which anionic-group-containing polymer is a reaction product among the polyol (A1) (polyol compound (A1) containing no anionic group), the polyol (A2) (polyol compound (A2) containing an anionic group), and the polyisocyanate (A3).

(7)

In Formula (7), $W^1$ is a residue corresponding to a skeleton of an anionic-group-containing polymer; a nitrogen atom combined with $W^1$ is a nitrogen atom derived from the terminal isocyanate group of the anionic-group-containing polymer, and $W^1$ has a structural unit represented by following Formula (7a)

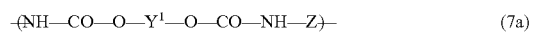
(7a)

wherein $Y^1$ is one of a residue derived from the polyol compound (A1) containing no anionic group and a residue derived from the polyol compound (A2) containing an anionic group; an oxygen atom combined with $Y^1$ is an oxygen atom derived from a hydroxyl group of one of the polyol compound (A1) containing no anionic group and the polyol compound (A2) containing an anionic group, wherein both the residue derived from the polyol compound (A1) containing no anionic group and the residue derived from the polyol compound (A2) containing an anionic group as $Y^1$ are contained in the polymer; and X, Z and n have the same meanings as defined above.

The moieties $W^1$ and $Y^1$ in Formula (7) correspond to W and Y in Formula (2) when the compound (A1) containing no anionic group and having plural isocyanate-reactive groups is a polyol compound (A1) containing no anionic group, and the compound (A2) having an anionic group and plural isocyanate-reactive groups is a polyol compound (A2) containing an anionic group.

The residue W in Formula (2), namely the reside W corresponding to the skeleton of the anionic-group-containing polymer has the structural unit represented by Formula (2a). The residue W thereby has a structural unit derived from the isocyanate-reactive compound (A1) such as the polyol compound (A1) containing no anionic group, a structural unit derived from the isocyanate-reactive compound (A2) such as the polyol compound (A2) containing an anionic group, and a structural unit derived from the polyisocyanate compound (A3). Bonds such as urethane bond and urea bond are formed between the polyisocyanate compound (A3) and the isocyanate-reactive compound (A1), and between the polyisocyanate compound (A3) and the isocyanate-reactive compound (A2). In other words, V combined with Y in Formula (2a) is a group, such as an oxygen atom (—O— group), an unsubstituted nitrogen atom (—NH— group), or a mono-substituted nitrogen atom, derived from the isocyanate-reactive group in a bonding site such as a urethane bond and a urea bond. The bonding site just mentioned above is formed as a result of the reaction between an isocyanate-reactive group of the isocyanate-reactive compound (A1) or of the isocyanate-reactive compound (A2) and an isocyanate group of the polyisocyanate compound (A3). Two Vs combined with Y may be the same group or different groups.

Two nitrogen atoms in Formula (2a), namely, a nitrogen atom combined with Z and a nitrogen atom on the opposite side to Z, are nitrogen atoms derived from isocyanate groups of the polyisocyanate compound (A3). A nitrogen atom combined with W in Formula (2) is a nitrogen atom derived from an isocyanate group of the polyisocyanate compound (A3). Namely, the anionic-group-containing polymer relating to W has an isocyanate group at its end, and the nitrogen atom combined with W is a nitrogen atom derived from the terminal isocyanate group of this anionic-group-containing polymer.

As X in Formula (2), the alkoxysilyl-containing groups represented by Formulae (2b), (2c), and (2d) are preferred, of which alkoxysilyl-containing groups represented by Formulae (2c) and (2d) are especially preferred.

The number n in Formula (2) is an integer from 1 to 4, preferably an integer from 1 to 3, and especially preferably 2 or 3.

It is especially preferred in Formula (2a) that Y is one of a residue derived from the polyol compound (A1-1) containing no anionic group and having a number-average molecular weight of equal to or more than 500, a residue derived from the polyol compound (A1-2) containing no anionic group and having a number-average molecular weight of less than 500, and a residue derived from the polyol compound (A2) containing an anionic group; and V combined with Y is an oxygen atom derived from a hydroxy group of the polyol compound (A1-1), a hydroxyl group of the polyol compound (A1-2), or a hydroxyl group of the polyol compound (A2), wherein all the residue derived from the polyol compound (A1-1), the residue derived from the polyol compound (A1-2), and the residue derived from the polyol compound (A2) are contained in the polymer.

The alkoxysilyl-containing group X represented by one of Formulae (2b), (2c), and (2d) can be introduced by using the ester-modified amino-group-containing alkoxysilane (A4-5) represented by one of Formulae (3a), (3b), and (3c).

The anionic-group-containing polymer represented by Formula (2) terminally having an alkoxysilyl group may form a salt. For example, it is acceptable that the anionic group in the anionic-group-containing polymer (A) terminally having an alkoxysilyl group is neutralized with the basic compound (B) to form a salt of the anionic group, as described later. The anionic-group-containing polymer represented by Formula (2) terminally having an alkoxysilyl group may be hydrolyzed. For example, the polymer may be a hydrolyzed polymer having a hydrolyzed alkoxysilyl group in which the terminal alkoxysilyl group is partially or completely hydrolyzed with water (C) to thereby form a silanol group and/or siloxane bond.

The anionic-group-containing polymer is a reaction product among the isocyanate-reactive compound (A1), the isocyanate-reactive compound (A2), and the polyisocyanate (A3). The reaction can be performed according to a known or conventional procedure for the preparation of a urethane prepolymer by reaction of a polyisocyanate compound with a polyol compound and/or a polyamine compound. The anionic-group-containing polymer preferably has an isocyanate group at its end. The polyol (A1) and the polyol (A2) are preferably used as the isocyanate-reactive compound (A1) and the isocyanate-reactive compound (A2), respectively, as described above. Naturally, a polyamine compound containing no anionic group can be used in combination with the polyol (A1) as the isocyanate-reactive compound (A1).

To accelerate the reaction, a polymerization catalyst can be used in mixing or in the reaction of the isocyanate-reactive compound (A1), the isocyanate-reactive compound (A2), and the polyisocyanate (A3). The reaction or mixing procedure can be performed in a solvent.

The reaction between the anionic-group-containing polymer and the alkoxysilane (A4) containing an isocyanate-reactive group can be performed by mixing the two components, where necessary, with heating. As a result of the reaction, the terminal isocyanate group of the anionic-group-containing polymer is alkoxysilylated to thereby yield the anionic-group-containing polymer (A) terminally having an alkoxysilyl group as the anionic-group-containing polymer having an alkoxysilylated end.

A polymerization catalyst can be used in the mixing or reaction procedure as mentioned above. Known or conventional polymerization catalysts (curing catalysts) for use, for example, in the reaction between a polyisocyanate compound and a polyol compound and/or a polyamine compound can be used as the polymerization catalyst. More specifically, such polymerization catalysts include, for example, organotin compounds, metallic complexes, amine compounds and other basic compounds, and organophosphate compounds. The organotin compounds include, but are not limited to, dibutyltindilaurate, dibutyltin maleate, dibutyltin phthalate, stannous octanoate, dibutyltin methoxide, dibutyltin diacetylacetate, and dibutyltin diversatates. The metallic complexes include, but are not limited to, tetrabutyl titanate, tetraisopropyl titanate, triethanolamine titanate, and other titanate compounds; lead octanoate, lead naphthenate, nickel naphthenate, cobalt naphthenate, and other metallic salts of carboxylic acids; aluminum acetylacetonato complex, vanadium acetylacetonato complex, and other metal acetylacetonato complexes. The amine compounds and other basic compounds include, but are not limited to, γ-aminopropyltrimethoxysilane, γ-aminopropyltriethoxysilane, and other aminosilanes; tetramethylammonium chloride, benzalkonium chloride, and other quaternary ammonium salts; DABCO series and DABCO BL series (trade names) available from Sankyo Air Products Co., Ltd., 1,8-diazabicyclo[5.4.0]undec-7-ene, and other linear or cyclic tertiary amines and quaternary ammonium salts each containing plural nitrogen atoms. The organophosphate compounds include, but are not limited to, monomethyl phosphate, di-n-butyl phosphate, and triphenyl phosphate.

A solvent can be used in the mixing or reaction procedure.

The order of addition of the individual components is not specifically limited and can be appropriately set according to the types of the components. However, when the polyol (A1) or the polyol compound (A1-1) and the polyol compound (A1-2) are used as the isocyanate-reactive compound (A1) and the polyamine compound (A1-2) is not used, the anionic-group-containing polymer (A) terminally having an alkoxysilyl group is preferably prepared in the following manner for its efficient preparation. Initially, the polyisocyanate (A3) is added to a mixture of the polyol (A2) with the polyol (A1), or a mixture of the polyol (A2) with the polyol compound (A1-1) and the polyol compound (A1-2), the resulting mixture is further treated with a polymerization catalyst where necessary for reaction to thereby yield the anionic-group-containing polymer, and the reaction mixture is treated with the alkoxysilane (A4) containing an isocyanate-reactive group to thereby yield the anionic-group-containing polymer (A) terminally having an alkoxysilyl group.

The preparation of the anionic-group-containing polymer (A) terminally having an alkoxysilyl group has been described by using the polyol (A1) and the polyol (A2) as the isocyanate-reactive compound (A1) and the isocyanate-reactive compound (A2), respectively. The anionic-group-containing polymer (A) terminally having an alkoxysilyl group can also be prepared according to a similar procedure by using the polyamine compound and/or the polythiol compound as the isocyanate-reactive compound (A1) and/or the isocyanate-reactive compound (A2).

For example, when the isocyanate-reactive compound (A1-1) and the polyamine compound (A1-2) as the isocyanate-reactive compound (A1-2) are used as the isocyanate-reactive compounds (A1), the polyamine compound (A1-2) can be added (i) during mixing and reaction among the isocyanate-reactive compound (A1-1), the isocyanate-reactive compound (A1-2), such as the polyol compound (A1-2), other than the polyamine compound (A1-2), and the polyisocyanate (A3) or after the preparation of an anionic-group-containing polymer as a result of the reaction among the isocyanate-reactive compound (A1-1), the isocyanate-reactive compound (A1-2), such as the polyol compound (A1-2), other than the polyamine compound (A1-2), and the polyisocyanate (A3). The polyamine compound (A1-2) is preferably used (ii) before, during, or after (preferably during or after) the dispersion of an anionic-group-containing polymer having partially alkoxysilylated end into the water (C). The anionic-group-containing polymer having partially alkoxysilylated end is obtained as a result of the reaction between an anionic-group-containing polymer and the alkoxysilane (A4) containing an isocyanate-reactive group, which anionic-group-containing polymer is obtained as a result of the reaction among the isocyanate-reactive compound (A1-1), the isocyanate-reactive compound (A1-2), such as the polyol compound (A1-2), other than the polyamine compound (A1-2), and the polyisocyanate (A3). Namely, the anionic-group-containing polymer (A) terminally having an alkoxysilyl group can be prepared as a result of the reaction between the anionic-group-containing polymer having a partially alkoxysilylated end and the polyamine compound (A1-2).

The proportions of the isocyanate-reactive compound (A1), the isocyanate-reactive compound (A2), the polyisocyanate (A3), and the alkoxysilane (A4) containing an isocyanate-reactive group are not specifically limited in the present invention. For example, the ratio of the polyisocyanate (A3) to the isocyanate-reactive compound (A1) and the isocyanate-reactive compound (A2) can be set within such a range that the equivalent ratio [NCO/NCO-reactive group] of the isocyanate group in the polyisocyanate compound (A3) to the isocyanate-reactive groups in the isocyanate-reactive compound (A1) and the isocyanate-reactive compound (A2) is more than 1 and less than or equal to 1.5, preferably more than 1 and less than or equal to 1.3, and more preferably more than 1 and less than or equal to 1.2. If the equivalent ratio NCO/NCO-reactive group is excessively high, such as more than 1.5, the water-based solid adhesive may have deteriorated stability and decreased contact bonding property. If the equivalent ratio NCO/NCO-reactive group is excessively low, such as less than or equal to 1, the silyl group may not sufficiently be introduced and the water-based solid adhesive may have deteriorated adhesion.

When the isocyanate-reactive compound (A1) and/or the isocyanate-reactive compound (A2) has three or more isocyanate-reactive groups, each at least two of the isocyanate-reactive groups in the isocyanate-reactive compound (A1) and/or the isocyanate-reactive compound (A2) may be combined with isocyanate groups of the polyisocyanate (A3), and residual isocyanate-reactive group(s), specifically hydroxyl group(s), can remain in the form of a free group.

The proportion of the polyisocyanate (A3) is preferably such that the content of isocyanate groups in the anionic-group-containing polymer is from 0.05% to 2.0% by mass, more preferably from 0.1% to 1.5% by mass, and especially preferably from 0.3% to 1.0% by mass. If the content of the isocyanate group is excessively high, such as more than 2.0% by mass, or is excessively low, such as less than 0.05% by mass, the water-based solid adhesive may have decreased adhesion.

The proportion of the isocyanate-reactive compound (A2) is preferably such that the content of anionic groups in the anionic-group-containing polymer (A) terminally having an alkoxysilyl group is from 0.2% to 5.0% by mass, more preferably from 0.5% to 4.0% by mass, and especially preferably from 0.8% to 3.5% by mass. If the content of the anionic group is excessively high, such as more than 5% by mass, the water-based solid adhesive may have an excessively high viscosity to deteriorate workability and may exhibit decreased water resistance after curing. If the content of the anionic group is excessively low, such as less than 0.2% by mass, the resin component in the water-based solid adhesive may not be stably dispersed.

The proportion of the alkoxysilane (A4) containing an isocyanate-reactive group is preferably such that the content of silicon atoms in the anionic-group-containing polymer (A) terminally having an alkoxysilyl group is from 0.05% to 1.0% by mass, more preferably from 0.1% to 0.8% by mass, and especially preferably from 0.2% to 0.6% by mass. If the silicon content is excessively high, such as more than 1.0% by mass, the water-based solid adhesive may have deteriorated stability and contact bonding property. If it is excessively low, such as less than 0.05% by mass, the water-based solid adhesive may have deteriorated adhesion.

The amount of the unsaturated carboxylic ester (A5) is preferably such that at least one secondary amino group is left intact in the ester-modified amino-group-containing alkoxysilane (A4-5). The amount can be selected, for example, within a range from about 0.8 to about 2 moles per mole of the primary and secondary amino groups in the primary amino group-containing alkoxysilane. The unsaturated carboxylic ester can be used in the reaction under such conditions that at least one secondary amino group is left intact.

[Basic Compounds (B)]

The basic compounds (B) can be any of basic inorganic compounds and basic organic compounds. Each of these basic compounds (B) can be used alone or in combination. Preferred examples of the basic inorganic compounds are sodium hydroxide, potassium hydroxide, and other alkali metal hydroxides; sodium carbonate, potassium carbonate, and other alkali metal carbonates; sodium hydrogencarbonate, potassium hydrogencarbonates, and other alkali metal hydrogencarbonates; sodium acetate, potassium acetate, other alkali metal acetates, and other alkali metal compounds; magnesium hydroxide, and other alkaline earth metal hydroxides; magnesium carbonate, other alkaline earth metal carbonates, and other alkaline earth metal compounds, as well as ammonia.

Preferred examples of the basic organic compounds are aliphatic amines, aromatic amines, basic nitrogen-containing heterocyclic compounds, and other amine compounds. The aliphatic amines include, but are not limited to, trimethylamine, triethylamine, tripropylamine, triisopropylamine, tributylamine, triisobutylamine, tri-s-butylamine, tri-t-butylamine, tripentylamine, trihexylamine, and other trialkylamines; dimethylamine, diethylamine, dibutylamine, and other dialkylamines; methylamine, ethylamine, butylamine, and other monoalkylamines; trimethanolamine, triethanolamine, tripropanolamine, triisopropanolamine, tributanolamine, tripentanolamine, triisopentanolamine, trihexanolamine, and other trialcoholamines; dimethanolamine, diethanolamine, and other dialcoholamines; methanolamine, ethanolamine, and other monoalcoholamines, as well as ethylenediamine, and diethylenetriamine. The aromatic amines include, for example, N,N-dimethylaniline. The basic nitrogen-containing heterocyclic compounds include, but are not limited to, morpholine, piperidine, pyrrolidine, and other cyclic amines, as well as pyridine, α-picoline, β-picoline, γ-picoline, quinoline, and N-methylmorpholine. Trialkylamines, trialcoholamines, and other tertiary amine compounds are preferred as the amine compounds.

Preferred examples of the basic compounds (B) for use in the present invention are sodium hydroxide, potassium hydroxide, and other alkali metal hydroxides, ammonia, and amine compounds. Sodium hydroxide, potassium hydroxide, other alkali metal hydroxides, and other basic inorganic compounds are preferred as the basic compounds (B) when the gelling agent (D) is a salt of an aliphatic carboxylic acid, such as a sodium salt and other alkali metal salts.

[Water (C)]

The water (C) for use in the present invention is not specifically limited and can be, for example, tap water, ion exchanged water, or pure water.

[Gelling Agents (D)]

The gelling agents (D) for use in the present invention are not specifically limited and can be appropriately selected from known gelling agents. Preferred examples of the gelling agents (D) are salts of aliphatic carboxylic acids each containing 8 or more carbon atoms ("fatty acid soaps"), reaction products between sugar alcohols each containing 4 or more carbon atoms and aromatic aldehydes, and salts of reaction products of glutamic acid and other amino acids with stearic acid and other higher fatty acids ("amino acid soaps"). Each of these gelling agents (D) can be used alone or in combination.

The aliphatic carboxylic acids each containing 8 or more carbon atoms include, but are not limited to, octanoic acid, nonanoic acid, decanoic acid, undecanoic acid, dodecanoic acid (lauric acid), tridecanoic acid, tetradecanoic acid (myristic acid), pentadecanoic acid, hexadecanoic acid (palmitic acid), heptadecaonic acid, octadecanoic acid (stearic acid), and other aliphatic saturated monocarboxylic acids; and oleic acid, and other aliphatic unsaturated monocarboxylic acids. In the present invention, aliphatic saturated monocarboxylic acids are preferred, of which myristic acid, stearic acid, and other aliphatic saturated monocarboxylic acids each containing about 14 to about 18 carbon atoms are especially preferred. The salts of these aliphatic carboxylic acids each containing 8 or more carbon atoms can be, for example, sodium salts, potassium salts, other alkali metal salts, and ammonium salts, of which sodium salts are preferred. Accordingly, sodium myristate and sodium stearate are optimum as the salts of the aliphatic carboxylic acids each containing 8 or more carbon atoms.

The sugar alcohols each containing 4 or more carbon atoms include, but are not limited to, threitol, erythritol, and other tetritols; arabitol, ribitol, xylitol, and other pentitols; sorbitol, mannitol, iditol, talitol, galactitol (dulcitol), allitol, and other hexitols; heptitols; octitols; nonitols; decitols; dodecitols; and other simple sugar alcohols. Among these sugar alcohols, xylitol, sorbitol, and other sugar alcohols each containing from 5 to 7 carbon atoms are preferred, of which sorbitol is especially preferred. The aromatic aldehydes include, but are not limited to, benzaldehyde, phthalaldehyde, isophthalaldehyde, terephthalaldehyde, carboxybenzaldehyde, nitrobenzaldehyde, cinnamaldehyde, salicylaldehyde, and anisaldehyde, of which benzaldehyde is preferred. By allowing these sugar alcohols each containing 4 or more carbon atoms to react with the aromatic aldehydes, benzalated products of the sugar alcohols are obtained. Among them, dibenzalated products having introduced two benzylidene groups are preferably used. Preferred examples of the reaction products between the sugar alcohols each containing 4 or more carbon atoms and the aromatic aldehydes for use in the present invention are dibenzalated xylitol as a reaction product between xylitol and benzaldehyde, and dibenzalated sorbitol as a reaction product between sorbitol and benzaldehyde.

[Polyoxyalkylene Compounds (E)]

The polyoxyalkylene compound (E) has at least an oxyethylene unit as a constitutional unit and has an unsaturated-bond-containing organic group. Polyoxyalkylene glycols having at least a polyoxyethylene unit can be advantageously used as the principal chain or main component thereof of the polyoxyalkylene compound (E). The amount of the oxyethylene unit in the polyoxyalkylene glycol having at least the polyoxyethylene unit can be equal to or more than 50% by mole, preferably equal to or more than 80% by mole, more preferably equal to or more than 90% by mole, and especially preferably equal to or more than 98% by mole based on the total moles of oxyalkylene units. When the amount of the oxyethylene unit based on the total oxyalkylene units is less than 50% by mole, the polyoxyalkylene compound (E) may have deteriorated hydrophilicity, may not stably exhibit adhesion capability and may not be applied with excellent workability.

Preferred examples of the unsaturated bond in the unsaturated-bond-containing organic group are carbon-carbon unsaturated bonds such as carbon-carbon double bond and carbon-carbon triple bond, of which carbon-carbon double bond is especially preferred. The unsaturated bond in the unsaturated-bond-containing organic group may comprise one unsaturated bond or two or more unsaturated bonds in combination. Such unsaturated-bond-containing organic groups include monovalent or polyvalent hydrocarbon groups having at least one unsaturated bond. The unsaturated-bond-containing organic group may be combined with the principal chain of the polyoxyalkylene compound (E) through a divalent group. Such divalent groups include, for example, alkylene groups, cycloalkylene groups, arylene groups, and other divalent hydrocarbon groups, oxygen atom (—O— group), unsubstituted nitrogen atom (—NH— group), mono-substituted nitrogen atom, and carbonyl group, and divalent groups each comprising two or more of these groups. The alkylene groups include, for example, methylene group, ethylene group, trimethylene group, propylene group, tetramethylene group, pentamethylene group, hexamethylene group, heptamethylene group, and octamethylene group. The cycloalkylene groups include, for example, cyclohexylene group.

The polyoxyalkylene compound (E) for use in the present invention preferably has the unsaturated-bond-containing organic group at least one of its ends (at one end or both ends). Accordingly, monovalent unsaturated-bond-containing organic groups are preferred as the unsaturated-bond-containing organic group. Among these monovalent unsaturated-bond-containing organic groups, examples of monovalent unsaturated-bond-containing hydrocarbon groups are aryl groups, cycloalkenyl groups, cycloalkadienyl groups, and vinyl group. The aryl groups include, but are not limited to, phenyl group, naphthyl group, anthryl group, phenanthryl group, and pyrenyl group, of which phenyl group is preferred. The cycloalkenyl groups include, for example, cyclohexenyl group. The cycloalkadienyl groups include, for example, cyclohexadienyl group. These aryl groups, cycloalkenyl groups, cycloalkadienyl groups, and vinyl group may be combined with the end of the polyoxyalkylene compound (E) through a divalent group, as described above. For example, when the aryl group is combined with the end (terminal oxygen atom) of the polyoxyalkylene compound (E) through a divalent group, the aryl group combined through the divalent group may form, for example, benzyl group, phenethyl group, and other aryl-alkyl groups; aryl-cycloalkyl groups; aryl-carbonyl groups; aryl-alkyl-carbonyl groups; and aryl-cycloalkyl-carbonyl groups. The cycloalkenyl group or cycloalkadienyl group combined through a divalent group may form corresponding groups to those of the aryl group combined through a divalent group. The vinyl group combined through a divalent group may form, for example, allyl group (2-propenyl group), isopropenyl group, and other vinyl-alkyl groups; vinyl-phenyl group, allyl-phenyl groups, and other vinyl-(alkyl)-aryl groups; vinyl-cyclohexyl group, allyl-cyclohexyl group, and other vinyl-(alkyl)-cycloalkyl groups; (meth)acryloyl groups (acryloyl group and methacryloyl group); (meth) acryloyloxyethyl group, (meth) acryloyloxypropyl group, and other (meth)acryloyloxyalkyl groups.

The unsaturated-bond-containing organic groups also include, for example, indenyl group, fluorenyl group, indanyl group, and other unsaturated-bond-containing hydrocarbon groups; pyridyl group, pyrazinyl group, pyrrolyl group, imidazolyl group, pyranyl group, furyl group, indolinyl group, isoindolinyl group, isochromanyl group, and other unsaturated-bond-containing heterocyclic groups.

Preferred examples of the unsaturated-bond-containing organic groups are aryl groups (especially phenyl group), aryl-alkyl groups (especially benzyl group and other phenyl-alkyl groups), vinyl-alkyl groups (especially allyl group), and (meth)acryloyl groups. Each of these unsaturated-bond-containing organic groups can be used alone or in combination.

Thus, preferred polyoxyalkylene compounds (E) are polyoxyalkylene compounds each comprising a polyoxyalkylene glycol having at least a polyoxyethylene unit and having an unsaturated-bond-containing hydrocarbon group as the unsaturated-bond-containing group introduced into at least one of its ends. The unsaturated-bond-containing hydrocarbon group is generally combined with the terminal oxygen atom of the polyoxyalkylene glycol having at least a polyoxyethylene unit, where necessary, through another group. The unsaturated-bond-containing hydrocarbon group can therefore be introduced using a reaction in which an oxygen atom is involved, such as etherification reaction and esterification reaction.

More specifically, examples of terminally phenylated polyoxyalkylene compounds each comprising a polyoxyalkylene glycol having at least a polyoxyethylene unit and having a phenyl group introduced into at least one end are polyoxyethylene monophenyl ether, polyoxyethylene monobenzyl ether, polyoxyethylene diphenyl ether, polyoxyethylene dibenzyl ether, polyoxyethylene monophenyl ether monobenzyl ether, alkoxy-polyoxyethylene monophenyl ethers each having one alkoxylated end, alkoxy-polyoxyethylene monobenzyl ethers each having one alkoxylated end, and other polyoxyethylenes each having a phenylated end; poly(oxyethylene-oxypropylene) monophenyl ether, poly(oxyethylene-oxypropylene) monobenzyl ether, poly(oxyethylene-oxypropylene) diphenyl ether, poly(oxyethylene-oxypropylene) dibenzyl ether, poly(oxyethylene-oxypropylene) monophenyl ether monobenzyl ether, alkoxy-poly(oxyethylene-oxypropylene) monophenyl ethers each having one alkoxylated end, alkoxy-poly(oxyethylene-oxypropylene) monobenzyl ethers each having one alkoxylated end, and other oxyethylene-oxypropylene copolymers each having a phenylated end.

Examples of terminally allylated polyoxyalkylene compounds each comprising a polyoxyalkylene glycol having at least a polyoxyethylene unit and having an allyl group introduced into at least one end include, but are not limited to, polyoxyethylene monoallyl ether, polyoxyethylene diallyl ether, alkoxy-polyoxyethylene monoallyl ethers each having one alkoxylated end, and other terminally allylated polyoxyethylenes; poly(oxyethylene-oxypropylene) monoallyl ether, poly(oxyethylene-oxypropylene) diallyl ether, alkoxy-poly(oxyethylene-oxypropylene) monoallyl ethers each having one alkoxylated end, and other terminally allylated oxyethylene-oxypropylene copolymers.

Examples of terminally (meth)acryloylated polyoxyalkylene compounds each comprising a polyoxyalkylene glycol having at least a polyoxyethylene unit and having a (meth)acryloyl group introduced into at least one end include, but are not limited to, polyoxyethylene mono(meth)acrylate, polyoxyethylene di(meth)acrylate, alkoxy-polyoxyethylene mono(meth)acrylates having one alkoxylated end, and other terminally (meth)acryloylated polyoxyethylenes; poly(oxyethylene-oxypropylene) mono(meth)acrylate, poly(oxyethylene-oxypropylene) di(meth)acrylate, alkoxy-poly(oxyethylene-oxypropylene) mono(meth)acrylates each having one alkoxylated end, and other terminally (meth)acrylated oxyethylene-oxypropylene copolymers.

Such alkoxy groups to be introduced into the end include, for example, methoxy group, ethoxy group, propoxy group, isopropoxy group, butoxy group, and other alkoxy groups each containing about 1 to about 20 carbon atoms, and preferably about 1 to about 10 carbon atoms.

The number-average molecular weight of the polyoxyalkylene compound (E) is, for example, from 100 to 5000, preferably from 200 to 5000, more preferably from 300 to 4000, and especially preferably from 500 to 3000.

By using the polyoxyalkylene compound (E), the water-based solid adhesive may have further improved shape retention and slidability and can thereby be further easily and smoothly applied. It can be applied in a further sufficient amount with further improved workability.

In particular, by using the polyoxyalkylene compound (E), the water-based solid adhesive can exhibit higher initial adhesion (initial cohesion) and can easily and stably bond adherends with each other. The water-based solid adhesive has high adhesion (initial adhesion) for holding bonded adherends after the application of the water-based solid adhesive to bonding surfaces of the adherends. Accordingly, even an ordinary user unsophisticated in bonding procedure can easily and stably bond the adherends using the water-based solid adhesive.

The use of the polyoxyalkylene compound (E) can also prevent drying of the water-based solid adhesive after the application and can significantly prolong an open time. Accordingly, by using the polyoxyalkylene compound (E), the water-based solid adhesive can further satisfactorily bond adherends by contact bonding. In addition, it can yield a larger effective adhesive area in contact bonding with good contact bonding property. It also has excellent fitting after attachment and exhibits good adhesion to plastics, metals and glass.

Thus, by using the polyoxyalkylene compound (E), the water-based solid adhesive can be applied to adherends with significantly improved workability and can effectively exhibit stable bonding capabilities.

The operation and advantages as described above may probably be derived from the following facts. The polyoxyalkylene compound (E) has good affinity with, and thereby acts as a plasticizer on, the anionic-group-containing polymer (A) terminally having an alkoxysilyl group. The polyoxyalkylene compound (E) is nonvolatile and hydrophilic and can thereby exhibit an activity as a humectant (moisturizing agent). In addition, it can exhibit an activity as a hardness regulator for smoothly applying the water-based solid adhesive to a surface of an adherend upon application. Thus, the water-based solid adhesive can bond adherends under broadened conditions, and all or most of appliers (users) can allow the water-based solid adhesive to stably exhibit excellent bonding effects.

There has been no disclosure of the use of the polyoxyalkylene compound (E) in water-based solid adhesives, and practical utility thereof has not been significantly known. The aforementioned operation and advantages have not been known. In addition, there has been no disclosure of the use of the anionic-group-containing polymer (A) terminally having an alkoxysilyl group as a polymer component of water-based solid adhesives. Thus, the excellent operation and advantages obtained by using the anionic-group-containing polymer (A) terminally having an alkoxysilyl group in combination with the polyoxyalkylene compound (E) are beyond all expectations.

[Curing Accelerators (F)]

The curing accelerator (F) is represented by following Formula (1):

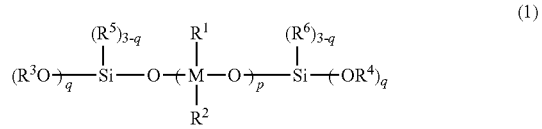

wherein M is one of tin atom, titanium atom, zirconium atom and bismuth atom; $R^1$ and $R^2$ are the same or different and are each a hydrocarbon group; $R^3$ and $R^4$ are the same or different and are each one of a hydrogen atom and a hydrocarbon group; $R^5$ and $R^6$ are the same or different and are each a hydrogen atom or a hydrocarbon group; p is an integer equal to or more than 1; and q is an integer from 1 to 3.

In Formula (1), M is a tin atom, titanium atom, zirconium atom or bismuth atom, of which tin atom is preferred as M.

In Formula (1), the hydrocarbon group as $R^1$ and $R^2$ includes, for example, aliphatic hydrocarbon groups, alicyclic hydrocarbon groups, and aromatic hydrocarbon groups. Such aliphatic hydrocarbon groups as $R^1$ and $R^2$ include, but are not limited to, methyl group, ethyl group, propyl group, isopropyl group, butyl group, isobutyl group, t-butyl group, s-butyl group, n-pentyl group, hexyl group, heptyl group, octyl group, 2-ethylhexyl group, nonyl group, decyl group, undecyl group, dodecyl group, tridecyl group, tetradecyl group, pentadecyl group, hexadecyl group, heptadecyl group, octadecyl group, and other alkyl groups each containing 1 to 20 carbon atoms.

The alicyclic hydrocarbon groups as $R^1$ and $R^2$ include, but are not limited to, cyclohexyl group, and other cycloalkyl groups each containing about 5 to 10 carbon atoms in their ring, as well as groups each having a polycyclic hydrocarbon ring such as a hydrocarbon ring in norbornane and other bridged rings. The aromatic hydrocarbon groups as $R^1$ and $R^2$ include, but are not limited to, phenyl group, naphthyl group, and other aryl groups.

Preferred examples of the hydrocarbon groups as $R^1$ and $R^2$ are aliphatic hydrocarbon groups, of which alkyl groups each containing 1 to 12 carbon atoms are more preferred, and alkyl groups each containing 1 to 6 carbon atoms are especially preferred. The substituents $R^1$ and $R^2$ may be different but are preferably the same with each other.

The hydrocarbon group as $R^3$ and $R^4$ in Formula (1) can be the aliphatic hydrocarbon groups, alicyclic hydrocarbon groups, aromatic hydrocarbon groups, and other hydrocarbon groups exemplified as the hydrocarbon groups as $R^1$ and $R^2$. The hydrocarbon groups as $R^3$ and $R^4$ are preferably aliphatic hydrocarbon groups, of which alkyl groups each containing about 1 to about 12, especially preferably about 1 to about 6, and particularly preferably about 1 to about 4 carbon atoms are more preferred. The substituents $R^3$ and $R^4$ may be different but are preferably the same with each other.

The hydrocarbon group as $R^5$ and $R^6$ in Formula (1) can be the aliphatic hydrocarbon groups, alicyclic hydrocarbon groups, aromatic hydrocarbon groups, and other hydrocarbon groups exemplified as the hydrocarbon groups as $R^1$ and $R^2$ or as $R^3$ and $R^4$. The hydrocarbon groups as $R^5$ and $R^6$ are preferably aliphatic hydrocarbon groups, of which alkyl groups each containing about 1 to about 12, especially preferably about 1 to about 6, and particularly preferably about 1 to about 4 carbon atoms are more preferred. The substituents $R^5$ and $R^6$ may be different but are preferably the same with each other.

In formula (1), p is not specifically limited, as long as it is an integer equal to or more than 1, and can be selected from integers, for example, from 1 to 10, preferably from 1 to 6, and more preferably from 1 to 4.

The repetition number q is an integer from 1 to 3, preferably 2 or 3, and more preferably 3. When q is 3, $R^5$ and $R^6$ are absent and three $OR^3$s and/or three $OR^4$s are combined with silicon atom(s) in Formula (1). The repetition number q relating to $OR^3$ and $R^5$ and the repetition number q relating to $OR^4$ and $R^6$ may be different but are preferably the same with each other.

The compounds represented by Formula (1) each have hydrolyzable silicon groups at both ends. Such hydrolyzable silicon groups include, but are not limited to, trimethoxysilyl group, triethoxysilyl group, tripropoxysilyl group, triisopropoxysilyl group, tributoxysilyl group, and other trialkoxysilyl groups; methyldimethoxysilyl group, methyldiethoxysilyl group, methyldipropoxysilyl group, methyldibutoxysilyl group, ethyldimethoxysilyl group, ethyldiethoxysilyl group, ethyldipropoxysilyl group, ethyldibutoxysilyl group, propyldimethoxysilyl group, propyldiethoxysilyl group, propyldipropoxysilyl group, propyldibutoxysilyl group, other alkyldialkoxysilyl groups, and corresponding dialkyl (mono) alkoxysilyl groups, as well as dialkoxysilyl groups and alkoxysilyl groups corresponding to these alkyldialkoxysilyl groups and dialkyl (mono) alkoxysilyl groups except with hydrogen atoms replacing their alkyl groups. The hydrolyzable silicon groups also include hydroxyl-group-containing silyl groups corresponding to the trialkoxysilyl groups, alkyldialkoxysilyl groups, and dialkyl (mono) alkoxysilyl groups except with a hydroxyl group replacing at least one of their alkoxy groups as a result of hydrolysis.

Examples of the compounds represented by Formula (1) are dialkylstannoxane disilicate compounds and poly(dialkylstannoxane) disilicate compounds. More specifically, examples of the compounds represented by Formula (1)

wherein M is a tin atom, $R^1$ and $R^2$ are alkyl groups, and p is 1, namely, examples of the dialkylstannoxane disilicate compounds are di(trialkoxysilyl-oxy)dialkyltin [dialkyltin bis(trialkoxysilicate)], di(alkyldialkoxysilyl-oxy)dialkyltin [dialkyltinbis(alkyl dialkoxysilicate)], and di(dialkylalkoxysilyl-oxy)dialkyltin [dialkyltin bis(dialkylalkoxysilicate)]. Examples of the compounds represented by Formula (1) wherein M is a tin atom, $R^1$ and $R^2$ are alkyl groups, and p is an integer equal to or more than 2, namely, examples of the poly(dialkylstannoxane) disilicates are poly (dialkylstannoxane) having trialkoxysilyl-oxy groups at both ends, poly(dialkylstannoxane) having alkyldialkoxysilyl-oxy groups at both ends, and poly(dialkylstannoxane) having dialkylalkoxysilyl-oxy groups at both ends.

Even in the coexistence with the anionic-group-containing polymer (A) terminally having an alkoxysilyl group, the curing accelerator (F) has excellent storage stability and can prevent or inhibit curing (crosslinking) of the anionic-group-containing polymer (A) terminally having an alkoxysilyl group for a long time under conditions such that water in a system does not decrease (for example, when the adhesive is stored in a vessel). In contrast, the water-based solid adhesive is cured (crosslinked) under such conditions that water in the system decreases as a result of drying due to evaporation or volatilization (for example, when the adhesive is applied to an open surface). In this case, the curing accelerator (F) can serve to further accelerate a curing speed. Consequently, the water-based solid adhesive of the present invention can have a further increased curing speed while maintaining excellent storage stability in spite of the use of the curing accelerator (F).

Thus, by using the curing accelerator (F), the curing speed can be further increased, and the time for aging (curing) or prepressing can be shortened to thereby exhibit excellent workability. In addition, the curing accelerator (F) does not adversely affect adhesion properties such as tackiness and adhesive strength during or after curing, and the water-based solid adhesive can thereby exhibit intrinsic excellent initial adhesion such as initial tackiness and initial adhesive strength. Thus, by using the curing accelerator (F), the water-based solid adhesive can be further easily and stably used in bonding, coating, and other procedures.

The curing accelerator (F) does not adversely affect heat resistance and water resistance of the water-based solid adhesive after curing. The water-based solid adhesive thereby has excellent heat resistance and water resistance after curing even when the curing accelerator (F) is used.

There has been no disclosure of the use of the curing accelerator (F) in water-based solid adhesives that are cured as a result of decrease of water in the system, and practical utility thereof has not been substantially known. Thus, the aforementioned operation and advantages have not been known. In addition, there has been no disclosure of the use of the anionic-group-containing polymer (A) terminally having an alkoxysilyl group as a polymer component of water-based solid adhesives. Thus, the excellent operation and advantages obtained by using the anionic-group-containing polymer (A) terminally having an alkoxysilyl group in combination with the curing accelerator (F) are beyond all expectations.

[Water-Based Solid Adhesives]

The water-based solid adhesives of the present invention each comprise the anionic-group-containing polymer (A) terminally having an alkoxysilyl group, the basic compound (B), the water (C), the gelling agent (D), and the polyoxyalkylene compound (E) and/or the curing accelerator (F) added according to necessity and are self-curable. In such self-curable water-based solid adhesives (hereinafter may be simply referred to as "water-based solid adhesive(s)"), it is preferred that a water-based resin composition is gelled by the gelling agent (D), which water-based resin composition comprises the anionic-group-containing polymer (A) terminally having an alkoxysilyl group, the basic compound (B), and the water (C), and where necessary the polyoxyalkylene compound (E) and/or the curing accelerator (F). The water-based resin composition can be a mixture of the anionic-group-containing polymer (A) terminally having an alkoxysilyl group, the basic compound (B) and the water (C), and where necessary the polyoxyalkylene compound (E) and/or the curing accelerator (F). Alternatively, the water-based resin composition can be a reaction composition containing a reaction product of the anionic-group-containing polymer (A) terminally having an alkoxysilyl group with the basic compound (B) and the water (C) as a result of the mixing. Such a reaction of the anionic-group-containing polymer (A) terminally having an alkoxysilyl group with the basic compound (B) includes a neutralization reaction in which the anionic group in the anionic-group-containing polymer (A) terminally having an alkoxysilyl group is partially or fully neutralized with the basic compound (B). Namely, the anionic group in the anionic-group-containing polymer (A) terminally having an alkoxysilyl group forms a salt as a result of the reaction between the anionic-group-containing polymer (A) terminally having an alkoxysilyl group and the basic compound (B).

The reaction of the anionic-group-containing polymer (A) terminally having an alkoxysilyl group with the water (C) includes, for example, a hydrolysis reaction in which the alkoxysilyl group at the end of the anionic-group-containing polymer (A) terminally having an alkoxysilyl group is hydrolyzed with the water (C). Namely, the terminal alkoxysilyl group of the anionic-group-containing polymer (A) terminally having an alkoxysilyl group is partially or fully converted into a silanol group and/or a siloxane bond as a result of the reaction between the anionic-group-containing polymer (A) terminally having an alkoxysilyl group and the water (C). In other words, at least one alkoxysilyl group among the terminal alkoxysilyl groups in the anionic-group-containing polymer (A) terminally having an alkoxysilyl group is affected by the hydrolysis reaction with the water (C). The term "silanol group" as used herein means a group comprising a silicon atom having at least one hydroxyl group, and the silanol group may have a substituent such as an alkoxy group.

The reaction products as a result of the reaction of the anionic-group-containing polymer (A) terminally having an alkoxysilyl group with the basic compound (B) and the water (C) include, for example, water-based silanolated polymers in which the anionic group in the anionic-group-containing polymer (A) terminally having an alkoxysilyl group is neutralized with the basic compound (B) to form a salt of the anionic group, and the terminal alkoxysilyl groups are partially or fully hydrolyzed with the water (C) to form a silanol group and/or a siloxane bond. In the water-based solid adhesives of the present invention, it is preferred that a water-based resin composition is gelled by the gelling agent (D), which water-based resin composition has an anionic group neutralized with the basic compound (B) and a terminal alkoxysilyl group hydrolyzed with the water (C) in the anionic-group-containing polymer (A) terminally having an alkoxysilyl group.

The water-based solid adhesives can be prepared by mixing the anionic-group-containing polymer (A) terminally having an alkoxysilyl group, the basic compound (B), the water (C), and the gelling agent (D), where necessary with the polyoxyalkylene compound (E) and/or the curing accelerator (F). The order of mixing these components is not specifically limited. For example, the water-based solid adhesives can be prepared in the following manner. Initially, the basic compound (B) and the water (C), and where necessary the polyoxyalkylene compound (E) are added to the anionic-group-containing polymer (A) terminally having an alkoxysilyl group, the resulting mixture is preferably vigorously stirred for accelerating the neutralization reaction, hydrolysis reaction, and other reactions to thereby yield an aqueous solution or an aqueous dispersion. Where necessary, the aqueous solution or aqueous dispersion is further treated with the curing accelerator (F) with stirring, and the resulting mixture is gelled with the gelling agent (D) and, if required, treated with a defoaming agent and other additives by, for example, mixing with stirring to thereby yield a water-based solid adhesive. The resulting adhesive is a water-based solid adhesive and the molding method for molding it into a specific shape is not specifically limited. For example, the water-based solid adhesive can be molded into a specific shape by placing the adhesive before solidification in a vessel or mold for molding into a specific shape or by molding the water-based solid adhesive after solidification into a specific shape.

The basic compound (B) can be used in the preparation of the anionic-group-containing polymer (A) terminally having an alkoxysilyl group. For example, the basic compound (B) may be added in a reaction of the alkoxysilane (A4) containing an isocyanate-reactive group with the reaction product of the isocyanate-reactive compound (A1), the isocyanate-reactive compound (A2), and the polyisocyanate (A3). Thus, the reaction can be performed in the presence of the basic compound (B).

The amount of the basic compound (B) can be selected within a range from about 50% to about 120% by mole, and preferably from about 80% to about 110% by mole relative to the anionic group in the anionic-group-containing polymer (A) terminally having an alkoxysilyl group.

The amount of the water (C) can be selected within a range of about 65 to about 900 parts by mass, and preferably about 100 to about 400 parts by mass relative to 100 parts by mass of the anionic-group-containing polymer (A) terminally having an alkoxysilyl group.

The amount of the gelling agent (D) can be selected within a range from about 0.02 to about 100 parts by mass, and preferably from about 5 to about 80 parts by mass relative to 100 parts by mass of the anionic-group-containing polymer (A) terminally having an alkoxysilyl group. If the amount of the gelling agent (D) is excessively small, the water-based solid adhesive may be difficult to solidify. If it is excessively large, the water-based solid adhesive may have deteriorated adhesion.

The amount of the polyoxyalkylene compound (E), if any, can be selected within a range from about 0.1 to about 50 parts by mass, preferably from about 1 to about 30 parts by mass, and more preferably from about 5 to about 25 parts by mass relative to 100 parts by mass of the anionic-group-containing polymer (A) terminally having an alkoxysilyl group.

The amount of the curing accelerator (F), if any, can be selected within a range from about 0.01 to about 2 parts by mass, and preferably from about 0.05 to about 1 part by mass relative to 100 parts by mass of the anionic-group-containing polymer (A) terminally having an alkoxysilyl group.

In the water-based solid adhesives of the present invention, the hydroxyl value (OHV) of the water-based resin composition before gelling is not specifically limited and can be selected within a range of, for example, about 60 to about 400 mg-KOH/g, and preferably about 80 to about 350 mg-KOH/g. The water-based resin composition before gelling is the water-based resin composition comprising the anionic-group-containing polymer (A) terminally having an alkoxysilyl group, the basic compound (B) and the water (C) with, where necessary, the polyoxyalkylene compound (E) and/or the curing accelerator (F). The neutralization ratio of the anionic group such as carboxyl group is not specifically limited and is preferably, for example, equal to or more than 80% and more preferably 90% to 100%. The resin content is not specifically limited and can be selected within a range from about 10% to about 60% by mass, and preferably from about 20% to about 50% by mass.

The water-based solid adhesives of the present invention can be completely water-based solid adhesives free of organic solvents. Namely, the water-based solid adhesives of the present invention can be free of organic solvents, although the fact is that conventionally commercially available water-based solid adhesives contain a small amount of organic solvents. The water-based solid adhesives of the present invention may further comprise a hydrophilic organic solvent (water-soluble organic solvent) such as ketones and lower alcohols for adjusting the viscosity of their aqueous solution or aqueous dispersion. Each of these organic solvents can be used alone or in combination. Examples of the ketones include acetone. Examples of the lower alcohols are methanol, ethanol, propanol, isopropanol, butanol, isobutanol, s-butanol, t-butanol, pentanol, hexanol, and other monohydric alcohols; ethylene glycol, propylene glycol, 1,2-butanediol, 1,3-butanediol, 1,4-butanediol, 1,6-hexanediol, glycerol, and other polyhydric alcohols. The water-soluble organic solvents also include propylene carbonate; dimethyl carbonate; trimethyl phosphate; diethers, diesters, and diallyl ethers of polyoxyethylene; diethers and diacetates of glycols; 1,3-dioxolane; and N-methyl-2-pyrrolidone. The amount of the organic solvents can be appropriately set depending on, for example, the magnitude of the viscosity to be adjusted and can be selected within a range, for example, from about 0 to about 100 parts by mass, and preferably from about 1 to about 50 parts by mass relative to 100 parts by mass of the anionic-group-containing polymer (A) terminally having an alkoxysilyl group.

The water-based solid adhesives may further comprise a hydrophilic solvent for improving or modifying wettability. Such hydrophilic solvents for improving wettability are not specifically limited and include, for example, N-methyl-2-pyrrolidone, polyoxyethylene alkyl ethers, and other surfactants, as well as sodium alginate, mucopolysaccharides, and sodium acrylate.

The water-based solid adhesives of the present invention may further comprise a humectant. By using the humectant, the water-based solid adhesives may have improved coating performance. Such humectants are not specifically limited and can be any of known or conventional humectants. Examples of the humectants are ethylene glycol, polyethylene glycols each having a number-average molecular weight of less than or equal to 400, ethylene glycol monoethyl ether and other Cellosolves, as well as diethylene glycol monoethyl ether and other carbitols, and other ethylene glycol derivatives; propylene glycol, propylene glycol monomethyl ether, and other propylene glycol derivatives; glycerol, 1,3-butanediol, and other polyhydric alcohols; sorbitol, and other polysaccharides; monoethanolamine, diethanolamine, triethanolamine, and other alkanolamines; and 1,3-dimethyl-2-imidazolidinone.

The water-based solid adhesives of the present invention may further comprise any of additives, other additional components and solvents. Such additives, additional components and solvents include, for example, defoaming agents, fillers, plasticizers, age resistors, ultraviolet absorbers, antioxidants, heat stabilizers, coloring agents such as pigments and dyes, antimolds (fungicides), wetting accelerators, viscosity improvers, perfumes, tackifiers such as emulsion tackifiers, coupling agents such as titanate coupling agents, aluminum coupling agents, and silane coupling agents, photo-curing catalysts, emulsifiers, surfactants, emulsions and latices, crosslinking agents, and water-soluble polymers. The fillers include, but are not limited to, calcium carbonate, treated calcium carbonates, fumed silica, clay, talc, balloons, Neuburg silica, kaolin, and aluminum silicate. The plasticizers include, but are not limited to, dioctyl phthalate, dibutyl phthalate, and other phthalic esters; dioctyl adipate, dibutyl sebacate, and other aliphatic carboxylic esters. The tackifiers include, but are not limited to, stabilized rosin esters, polymerized rosin esters, terpene phenol, petroleum resins, and other emulsion tackifiers. The crosslinking agents include, for example, isocyanate crosslinking agents, epoxy crosslinking agents, carbodiimide crosslinking agents, aziridine crosslinking agents, polyethyleneimine crosslinking agents, melamine crosslinking agents, and colloidal silica. The solvents for use in the present invention are not specifically limited as long as they are miscible or compatible with the anionic-group-containing polymer (A) terminally having an alkoxysilyl group, the basic compound (B), the water (C), the gelling agent (D), and other components.

As described above, the water-based solid adhesives of the present invention comprise, as an adhesive component polymer, the anionic-group-containing polymer (A) terminally having an alkoxysilyl group, which comprises an anionic-group-containing polymer having an end alkoxysilylated by the alkoxysilane compound (A4) containing an isocyanate-reactive group. The anionic-group-containing polymer (A) terminally having an alkoxysilyl group forms a water-based silanolated polymer with the basic compound (B) and the water (C) in the water-based solid adhesives. Accordingly, when the water-based solid adhesive is applied and water therein decreases by evaporation, the silanol group of the water-based silanolated polymer in the water-based solid adhesive undergoes a condensation reaction and the water-based solid adhesive is cured (crosslinked). Specifically, the adhesive component polymer in the water-based solid adhesives of the present invention has reactivity and reacts to cure and crosslink to thereby exhibit adhesion. Namely, the water-based solid adhesives of the present invention are self-curable water-based solid adhesives. In contrast, adhesive component polymers in conventional water-based solid adhesives do not react in curing but solidify by evaporation of water to thereby exhibit adhesion.

The adhesive component polymer in the present invention has a skeleton having a urethane bond but its end is alkoxysilylated with the alkoxysilane compound (A4) containing a primary or secondary amino group and thereby has condensation reactivity due to silanol group. The polymer is not a regular polyurethane but is an anionic-group-containing polymer terminally having an alkoxysilyl group. The adhesive component polymer in the water-based solid adhesives of the present invention is not only different in structure but also significantly different in mechanism for exhibiting adhesion and in operation and advantages due to the polymer structure from the adhesive component polymers in conventional water-based solid adhesives as will be described in detail later.

The condensation reaction of the silanol group of the water-soluble silanolated polymer in the water-based solid adhesives of the present invention plays a major role in curing, and the water-based solid adhesives have a curing speed less dependent on the drying speed of water and have a higher initial adhesive strength than conventional equivalents. The crosslinking reaction proceeds with a decreasing water and can proceed even in the presence of water to some extent, and the water-based solid adhesives can thereby exhibit cohesion even when they contain some water.

An ion center (a salt of the anionic group, such as a carboxylic acid salt) is introduced into the molecule of the water-based silanolated polymer for making it water-borne and plays a role as an accelerating catalyst of the condensation reaction between the silanol groups. This may also be involved in the higher curing speed and higher initial adhesive strength of the water-based solid adhesives.

Thus, the water-based solid adhesives of the present invention have high initial adhesive strength, can thereby bond adherends without prepressing or with prepressing in a shorter time with good workability and can easily bond plural adherends. In particular, they have excellent initial adhesive strength even when they are free of organic solvents and are completely water-based.

In addition, the anionic-group-containing polymer (A) terminally having an alkoxysilyl group serving as an adhesive component polymer in the water-based solid adhesives of the present invention can be a polymer having a relatively low molecular weight. For example, its number-average molecular weight can be selected within a range from about 3000 to 50000 and preferably from about 10000 to 30000. The anionic-group-containing polymer (A) forms a polymer having a higher molecular weight due to formed siloxane bonds after curing.

The water-based solid adhesives of the present invention can further satisfactorily bond adherends by contact bonding by using the isocyanate-reactive compound (A1-1) having a number-average molecular weight of equal to or more than 500 and the isocyanate-reactive compound (A1-2) having a number-average molecular weight less than 500 in combination as the isocyanate-reactive compound (A1). In addition, by using the polyol compound (A1-2) as the isocyanate-reactive compound (A1-2), they can much further satisfactorily bond adherends by contact bonding.

The water-based solid adhesives of the present invention can have further improved initial adhesive strength, namely can be fast-cure water-based solid adhesives by using the isocyanate-reactive compound (A1-1) having a number-average molecular weight of equal to or more than 500 and the isocyanate-reactive compound (A1-2) having a number-average molecular weight less than 500 in combination as the isocyanate-reactive compound (A1) and using the polyamine compound (A1-2) containing no anionic group and having a number-average molecular weight less than 500 as the isocyanate-reactive compound (A1-2) having a number-average molecular weight less than 500.

In contrast to conventional water-based solid adhesives, the water-based solid adhesives of the present invention can bond adherends by contact bonding, can be used as contact-bonding stick adhesives (contact type stick adhesives) and can bond nonporous articles with each other by appropriately selecting the isocyanate-reactive compound(s) (A1). They can also have further higher initial adhesive strength than conventional water-based solid adhesives, can be used as fast cure type stick adhesives (fast cure stick adhesives) and can bond nonporous adherends with each other by appropriately selecting the isocyanate-reactive compound(s) (A1), namely by using the polyamine compound (A1-2).

By using the polyoxyalkylene compound (E) and/or the curing accelerator (F), the operation and advantages of these compounds can be effectively exhibited, and the resulting water-based solid adhesives become more excellent. For example, by using the polyoxyalkylene compound (E), the water-based solid adhesives can have further improved initial adhesive strength and can thereby further easily and stably bond adherends with each other. Accordingly, even ordinary users unsophisticated in bonding procedure can easily and stably bond the adherends using the water-based solid adhesives without misoperation. By using the curing accelerator (F), the water-based solid adhesives can be cured in a further higher speed and become further excellent fast cure stick adhesives.

When the anionic-group-containing polymer (A) terminally having an alkoxysilyl group has a number-average molecular weight on the order of several tens of thousands, the water-based resin composition comprising the anionic-group-containing polymer (A) terminally having an alkoxysilyl group, the basic compound (B), and the water (C), where necessary with the polyoxyalkylene compound (E) and/or the curing accelerator (F) is prepared as an aqueous solution or a colloidal dispersion and can thereby be advantageously molded into a stick adhesive by using the gelling agent (D).

The polymer serving as an adhesive component in the water-based solid adhesives of the present invention forms a crosslinked structure and becomes reticulate as a result of curing. The adhesive after curing thereby exhibits excellent water resistance and heat resistance. In other words, the water-based or aqueous polymer exhibits high adhesion and has excellent water resistance and heat resistance after curing.

In addition, the water-based solid adhesives of the present invention each have the polymer serving as an adhesive component and having a silanol group and can thereby exhibit good adhesion not only to paper and other porous materials but also to metals, glass, and other nonporous materials. Adherends to be bonded using the water-based solid adhesives of the present invention are not specifically limited and include various adherends as described later.

The reason why the silanol groups of the water-based silanolated polymer in the water-based solid adhesives of the present invention remain stable in spite of containing water is not clarified but is probably as follows. For example, the silanol groups are protected by a large amount of water molecules in the system to thereby prevent or inhibit the condensation reaction between the silanol groups. Alternatively or in addition, the silanol groups are protected by a substituent combined with the nitrogen atom of a secondary amino group or tertiary amino group derived from the amino-group-containing alkoxysilane (A4-1) serving as the alkoxysilane compound (A4) containing an isocyanate-reactive group to thereby prevent or inhibit the condensation reaction between the silanol groups. The substituent just mentioned above is, for example, a long chain substituent, or an ester moiety thereof, derived from the unsaturated carboxylic ester (A5). Thus, the water-based solid adhesives of the present invention have excellent stability and exhibit a high curing speed despite that they are one-part crosslinking water-based adhesives.

In addition, the water-based solid adhesives are waterborne, can be completely waterborne free of organic solvents and thereby have excellent handleability and high safety to humans and the environment.

Particularly, the water-based solid adhesives of the present invention can keep their shapes satisfactorily, are thereby resistant to breaking in application and are prevented from breaking during application. They also have good slidability and are thereby easily applied to adherends, for example, by coating. They can be cured without heating and can be cured even at room temperature.

The water-based solid adhesives of the present invention are therefore very useful as contact bonding type or fact curing type stick adhesives, and other stick adhesives.

The anionic-group-containing polymers represented by Formula (2) each terminally having an alkoxysilyl group, wherein X in Formula (2) is the alkoxysilyl-containing group represented by any of Formulae (2b), (2c), and (2d), can be used as polymer components of not only such water-based solid adhesives, but also of water-based adhesives other than water-based solid adhesives, water-based coating compositions such as water-based paints, as well as binders, laminates, sealers, primers, sizing agents, and sealants. Among them, anionic-group-containing polymers represented by Formula (2) each terminally having an alkoxysilyl group, where in X in Formula (2) is the alkoxysilyl-containing group represented by any of Formulae (2c) and (2d), are especially preferred as such polymer components. These polymers can be prepared as solid compositions such as water-based solid adhesives by using the gelling agent (D). Alternatively, when the gelling agent (D) is not used, the polymers can be prepared as liquid compositions such as one-part water-based adhesives and water-based coating agents, and other water-based liquid adhesives. Naturally, they can be prepared as contact bonding type or fast curing type water-based compositions by appropriately selecting the isocyanate-reactive compound(s) (A1) and other components.

When the water-based solid adhesives of the present invention are contact bond adhesives, they can bond adherends by contact bonding. When the water-based solid adhesives are fast cure adhesives and other adhesives than contact bond adhesives, they can bond adherends by regular bonding and can be cured fast. The water-based adhesives prepared without the use of the gelling agent (D) can also bond adherends by contact bonding or regular bonding. In the bonding procedure, various adherends can be used.

Such adherends to be bonded using the water-based solid adhesives of the present invention are not specifically limited, can be any of porous materials and nonporous materials and can be selected from among a wide variety of materials. More specifically, the materials for such adherends include, but are not limited to, wood, plywood, chipboards, particle boards, hardboards, and other woody materials; slates, calcium silicate boards, mortar, tiles, and other inorganic materials; melamine resin overlaid boards, Bakelite boards, foaming polystyrene, films and molded articles of plastics, such as poly(vinyl chloride) films and molded articles, polyester films and molded articles, and polystyrene films and molded articles, and other plastic materials; naturally-occurring rubbers, synthetic rubbers, silicone rubbers, and other rubber materials; corrugated cardboard, paper boards, kraft paper, and other paper materials, as well as moisture-proof paper, other surface treated converted paper, other converted paper, and other paper materials that are difficult to bond, glass materials, metallic materials such as iron, aluminum, stainless steel, and copper, leather materials, fabrics, non-woven fabrics, and other fibrous materials. Conventional stick adhesives have been virtually applied to paper and other adherends of porous materials. In contrast, the water-based solid adhesives of the present invention can be applied to adherends comprising a wide variety of materials and can also be applied to bonding of nonporous materials with each other by contact bonding.

The adherends can be adherends comprising the same material or may be adherends comprising different materials. Each of these adherends can be used alone or in combination.

Thus, the water-based solid adhesives of the present invention can be advantageously used as, for example, wood-paper water-based solid adhesives for bonding wood products comprising woody materials or paper products comprising paper materials or paper materials that are difficult to bond, of which water-based solid adhesives for schoolchildren are preferred; leather-plastic water-based solid adhesives for bonding leather products comprising leather materials or plastic products comprising plastic materials, of which water-based solid adhesives for use in hobbies are preferred; fiber water-based solid adhesives for bonding fibrous materials; household water-based solid adhesives for use in a wide variety of applications at home, of which water-based solid adhesives for repairing furniture are preferred; industrial water-based solid adhesives for bonding plastic boards, foaming polystyrene, plywood, wallpapers, upholstery, and other materials.

The water-based solid adhesives of the present invention can be used in various bonding procedures such as a process in which adherends are bonded with each other immediately after the application of the water-based solid adhesive to the adherends, and a contact bonding process in which adherends are bonded with each other when the water-based solid adhesive exhibits cohesion (tackiness) after a set time period from the application of the water-based solid adhesive to the adherends. The water-based solid adhesives can bond adherends by contact bonding despite that they are water-based solid adhesives. Contact bonding processes for use in the present invention include a process as described in Japanese Industrial Standards (JIS) K 6800 in which the adhesive in question is applied to two bonding faces of two adherends to be bonded, and the two adherends are affixed or attached when the adhesive exhibits its tackiness after a lapse of a set time period, as well as a process in which the adhesive is applied to one face of one of two adherends to be bonded, and the two adherends are affixed when the adhesive exhibits its tackiness after a lapse of a set time period. The term "contact bonding" as used herein means a procedure in which the adhesive is applied to a bonding face of at least one of two adherends to be bonded, and the two adherends are affixed or attached when the adhesive exhibits its tackiness after a lapse of a set time period.

As is described above, the water-based solid adhesives of the present invention can be applied with good workability, have excellent fitting after attachment of adherends, have good adhesion to plastics, metals, and glass and exhibit excellent heat resistance and water resistance after curing. They also have high safety to humans and the environment. They can keep their shapes satisfactorily, have excellent slidability and can thereby be easily applied. In addition, they can bond adherends by contact bonding despite that they are water-based solid adhesives. Accordingly, the water-based solid adhesives of the present invention are very useful as stick adhesives.

EXAMPLES

The present invention will be illustrated in further detail with reference to several examples below, which are not intended to limit the scope of the invention. All parts and percentages are by mass unless otherwise specified. Materials used in the examples and comparative examples are as follows.

[Compounds Containing No Anionic Group and Having Plural Isocyanate-Reactive Groups]

Trade name "PTMG 2000" [a polytetramethylene ether glycol available from Mitsubishi Chemical Corporation, number-average molecular weight: 2000, hydroxyl value: 56.1 mg-KOH/g; hereinafter may be referred to as "isocyanate-reactive compound (A1-a)"]

(2) Trade name "NS 2471" [a polyester diol available from Asahi Denka Co., Ltd., number-average molecular weight: 2000, hydroxyl value: 56.1 mg-KOH/g; hereinafter may be referred to as "isocyanate-reactive compound (A1-b)"]

(3) Trade name "PLACCEL 220EC" [a polycarbonate diol available from Daicel Chemical Industries, Ltd., number-average molecular weight: 2000, hydroxyl value: 56.1 mg-KOH/g; hereinafter may be referred to as "isocyanate-reactive compound (A1-c)"]

(4) 1,4-Butanediol [hereinafter may be referred to as "isocyanate-reactive compound (A1-d)"]

(5) Ethylenediamine [hereinafter may be referred to as "isocyanate-reactive compound (A1-e)"]

[Compound Having an Anionic Group and Plural Isocyanate-Reactive Groups]

(1) 2,2-Dimethylolbutanoic acid [hydroxyl value: 758.1 mg-KOH/g; hereinafter may be referred to as "isocyanate-reactive compound (A2-1)"]

[Polyisocyanate Compound]

(1) Isophorone diisocyanate [isocyanate content (NCO content): 37.8%, IPDI; hereinafter may be referred to as "polyisocyanate (A3-1)"]

[Alkoxysilane Compounds Containing Isocyanate-Reactive Group]

(1) Trade name "KBM 602" [N-β(aminoethyl)-γ-aminopropylmethyldimethoxysilane available from Shin-Etsu Chemical Co., Ltd.; hereinafter may be referred to as "amino-group-containing alkoxysilane (A4-1)"]

(2) Trade name "KBM 603" [N-β(aminoethyl)-γ-aminopropyltrimethoxysilane available from Shin-Etsu Chemical Co., Ltd.; hereinafter may be referred to as "amino-group-containing alkoxysilane (A4-2)"]

(3) Trade name "KBM 903" [γ-aminopropyltrimethoxysilane available from Shin-Etsu Chemical Co., Ltd.; hereinafter may be referred to as "amino-group-containing alkoxysilane (A4-3)"]

(4) Trade name "KBM 573" [N-phenyl-γ-aminopropyltrimethoxysilane available from Shin-Etsu Chemical Co., Ltd.; hereinafter may be referred to as "amino-group-containing alkoxysilane (A4-4)"]

(5) Trade name "KBM 803" [γ-mercaptopropyltrimethoxysilane available from Shin-Etsu Chemical Co., Ltd.; hereinafter may be referred to as "amino-group-containing alkoxysilane (A4-5)"]

[Unsaturated Carboxylic Ester]

(1) 2-Ethylhexylacrylate [hereinafter may be referred to as "carboxylic ester (A5-1)"]

[Basic Compound]

Sodium hydroxide

[Water]

Ion-exchanged water (deionized water)

[Gelling Agent]

Sodium stearate

[Polyoxyalkylene Compounds having an Unsaturated-bond-containing Organic Group and at Least an Oxyethylene Unit, and Other Hydrophilic Compounds]

Polyethylene glycol having a phenylated end and having a number-average molecular weight of 500 (hereinafter may be referred to as "hydrophilic compound (1)")

Polyethylene glycol having a phenylated end and having a number-average molecular weight of 100 (hereinafter may be referred to as "hydrophilic compound (2)")

Polyethylene glycol having a phenylated end and having a number-average molecular weight of 2000 (hereinafter may be referred to as "hydrophilic compound (3)")

Figure 2:
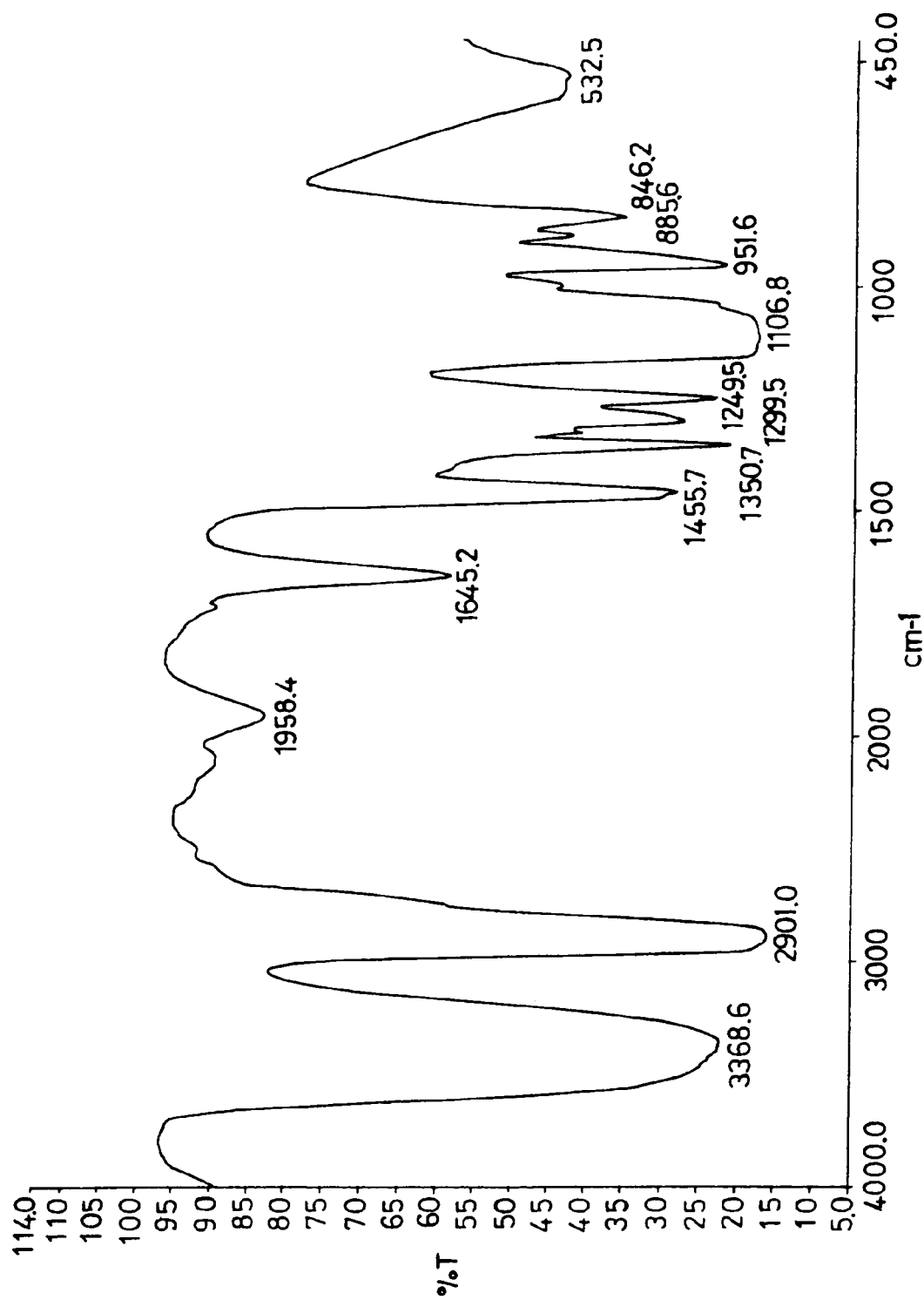
FIG. 2 is a graph showing infrared absorption spectral data of a polyethylene glycol having a number-average molecular weight of 500.
Figure 3:
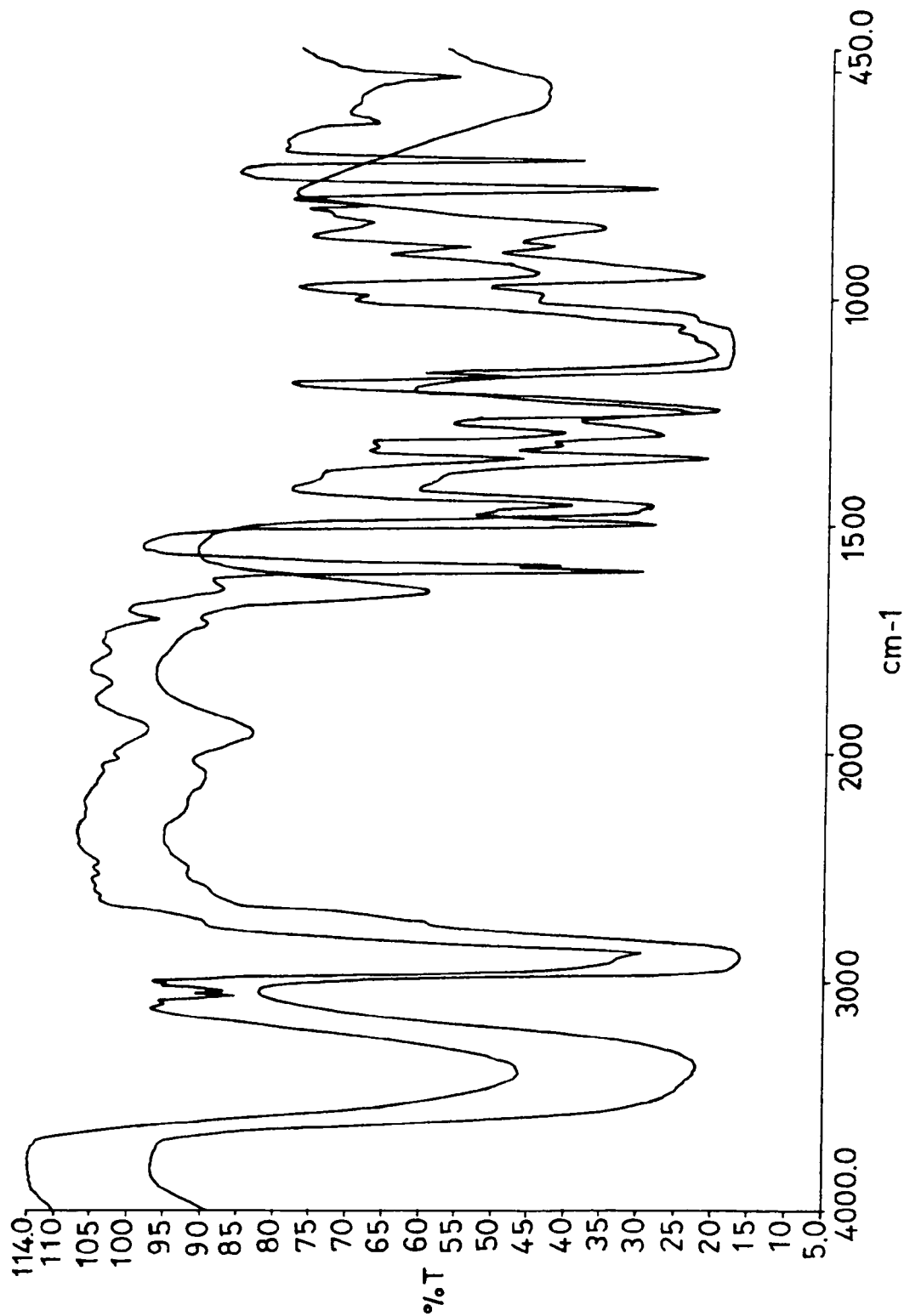
FIG. 3 is a graph of the superimposition of the infrared absorption spectral data of FIG. 1 and the infrared absorption spectral data of FIG. 2.

Infrared absorption spectra (IR) of the hydrophilic compound (1) [the polyethylene glycol having a phenylated end and having a number-average molecular weight of 500] and a polyethylene glycol having a number-average molecular weight of 500 were determined at room temperature using a KBr plate. The resulting infrared absorption spectral data are shown in FIGS. 1 and 2, respectively. FIGS. 1 and 2 are graphs showing the infrared absorption spectral data of the hydrophilic compound (1) (the polyethylene glycol having a phenylated end) and of the polyethylene glycol having a number-average molecular weight of 500, respectively. FIG. 3 is a graph showing the superimposition of the infrared absorption spectral data of FIG. 1 and the infrared absorption spectral data of FIG. 2. FIGS. 1, 2, and 3 show that the polyethylene glycol having a phenylated end can be clearly distinguished from the regular polyethylene glycol in the infrared absorption spectra.

Figure 4:
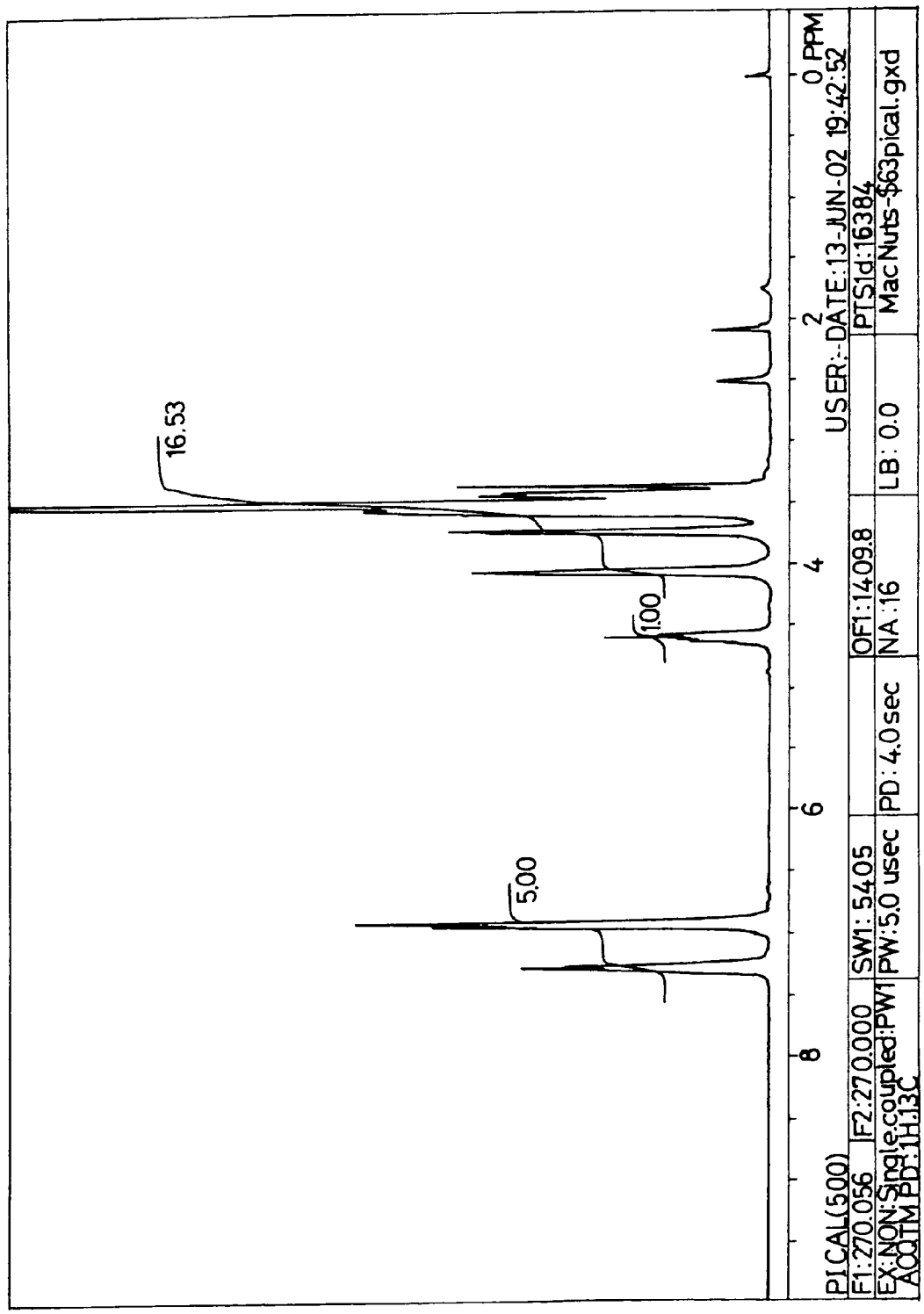
FIG. 4 is a graph showing $^1$H-nuclear magnetic resonance spectral data of the hydrophilic compound (1) (polyethylene glycol having a phenylated end).
Figure 5:
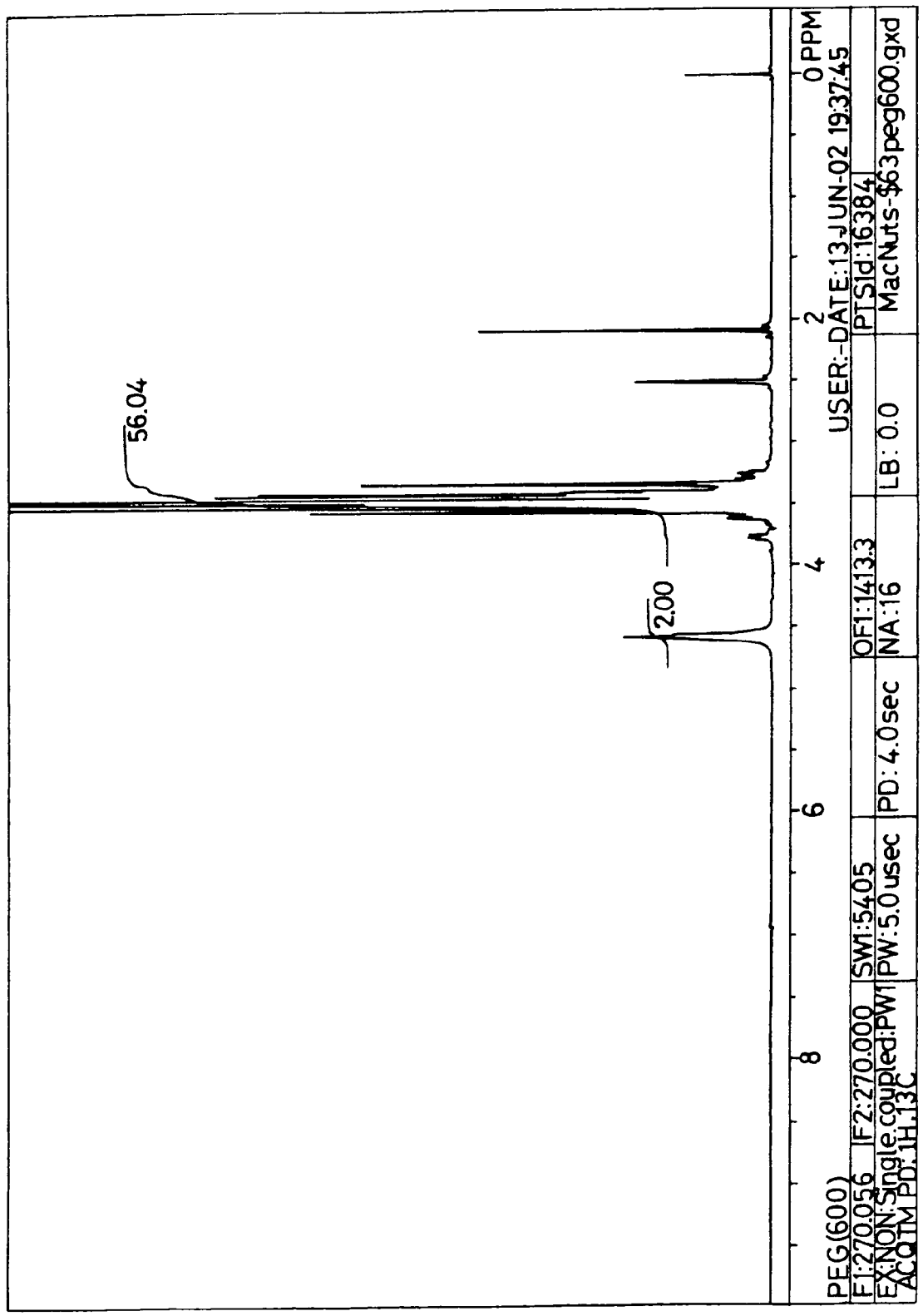
FIG. 5 is a graph showing $^1$H-nuclear magnetic resonance spectral data of the polyethylene glycol having a number-average molecular weight of 500.

In addition, $^1$H-nuclear magnetic resonance spectra (NMR) of the hydrophilic compound (1) [the polyethylene glycol having a phenylated end and having a number-average molecular weight of 500] and the polyethylene glycol having a number-average molecular weight of 500 were determined. The resulting $^1$H-nuclear magnetic resonance spectral data are shown in FIGS. 4 and 5, respectively. FIGS. 4 and 5 are graphs showing the $^1$H-nuclear magnetic resonance spectral data of the hydrophilic compound (1) (the polyethylene glycol having a phenylated end) and of the polyethylene glycol having a number-average molecular weight of 500, respectively. FIGS. 4 and 5 show that the polyethylene glycol having a phenylated end can also be clearly distinguished from the regular polyethylene glycol in the $^1$H-nuclear magnetic resonance spectra.

Accordingly, the hydrophilic compounds (1), (2) and (3) each have an unsaturated-bond-containing organic group and at least an oxyethylene unit and fall into the polyoxyalkylene compounds (E). The hydrophilic compounds (1), (2) and (3) are polyethylene glycols having a phenylated end obtained by introducing a phenyl group or benzyl group into the end of a polyethylene glycol.

[Curing Accelerators]

(1) Trade name "NEOSTANN U-303" [dibutyltin bis(triethoxysilicate); $(n-C_4H_9)_2Sn[OSi(OC_2H_5)_3]_2$, available from Nitto Kasei Co., Ltd.; hereinafter may be referred to as "curing accelerator (1)"]

(2) Trade name "NEOSTANN U-700" [bis(dibutylstannoxane) bis(triethoxysilicate); $\{[(C_2H_5O)_3SiO](n-C_4H_9)_2Sn\}_2O$, available from Nitto Kasei Co., Ltd.; hereinafter may be referred to as "curing accelerator (2)"]

Preparation Example 1

The carboxylic ester (A5-1) was mixed with the amino-group-containing alkoxysilane (A4-1) in a ratio of the former to the later of 2:1 by mole, the resulting mixture was allowed to react at 50° C. for 7 days and thereby yielded a reaction product (hereinafter may be referred to as "amino-group-containing alkoxysilane (A4-a)").

Preparation Example 2

The carboxylic ester (A5-1) was mixed with the amino-group-containing alkoxysilane (A4-2) in a ratio of the former to the later of 2:1 by mole, the resulting mixture was allowed to react at 50° C. for 7 days and thereby yielded a reaction product (hereinafter may be referred to as "amino-group-containing alkoxysilane (A4-b)").

Preparation Example 3

The carboxylic ester (A5-1) was mixed with the amino-group-containing alkoxysilane (A4-3) in a ratio of the former to the later of 1:1 by mole, the resulting mixture was allowed to react at 50° C. for 7 days and thereby yielded a reaction product (hereinafter may be referred to as "amino-group-containing alkoxysilane (A4-c)").

Example 1

In a four-neck separable flask equipped with a stirrer, a nitrogen supply tube, a thermometer, and a condenser, 100 parts of the isocyanate-reactive compound (A1-a), 16.7 parts of the isocyanate-reactive compound (A2-1), 57 parts of the polyisocyanate (A3-1), 7.7 parts of the isocyanate-reactive compound (A1-d), and 40 parts of acetone were placed and were allowed to react at a temperature of 75° C. to 80° C. under the flow of nitrogen gas for 3 hours and thereby yielded a reaction mixture containing a carboxyl-group-containing polymer terminally having an isocyanate group and containing 0.4% of residual isocyanate group.

All of the reaction mixture containing the carboxyl-group-containing polymer terminally having an isocyanate group was further treated with 10 parts of the amino-group-containing alkoxysilane (A4-a) at a temperature of 75° C. to 80° C. under the flow of nitrogen gas for 1 hour and thereby yielded a reaction mixture containing a carboxyl-group-containing polymer terminally having an alkoxysilyl group.

Next, the reaction mixture containing the carboxyl-group-containing polymer terminally having an alkoxysilyl group was cooled to 40° C. and was then added to an aqueous solution containing 4.5 parts of sodium hydroxide in 294 parts of deionized water with stirring at a high speed and thereby yielded a dispersion. Acetone was the removed from the dispersion by distillation at 45° C. to 50° C. under reduced pressure, the resulting dispersion was adjusted to a solid content of 40% with deionized water and thereby yielded a water-based silanolated resin composition.

In a flask in a thermostatic bath at 80° C., 100 parts of the water-based silanolated resin composition (stock composition) and 7 parts of sodium stearate were placed with stirring, the resulting mixture was then taken out from the flask 1 hour later, was placed in a stick-shaped case without delay, was left stand to cool and thereby yielded a stick adhesive.

Examples 2 to 9

Stick adhesives according to Examples 2 to 9 were prepared by the procedure of Example 1, except that they have compositions shown in Tables 1 and 2.

Example 10

In a four-neck separable flask equipped with a stirrer, a nitrogen supply tube, a thermometer, and a condenser, 100 parts of the isocyanate-reactive compound (A1-b), 6.0 parts of the isocyanate-reactive compound (A1-d), 16.7 parts of the isocyanate-reactive compound (A2-1), 60.6 parts of the polyisocyanate (A3-1), and 40 parts of acetone were placed and were allowed to react at a temperature of 75° C. to 80° C. under the flow of nitrogen gas for 3 hours and thereby yielded a reaction mixture containing a carboxyl-group-containing polymer terminally having an isocyanate group and containing 2.0% of residual isocyanate group.

All of the reaction mixture containing the carboxyl-group-containing polymer terminally having an isocyanate group was further treated with 20.7 parts of the amino-group-containing alkoxysilane (A4-b) at a temperature of 75° C. to 80° C. under the flow of nitrogen gas for 1 hour and thereby yielded a reaction mixture containing a carboxyl-group-containing polymer terminally having an isocyanate group and an alkoxysilyl group.

Next, the reaction mixture containing the carboxyl-group-containing polymer terminally having an isocyanate group and an alkoxysilyl group was cooled to 40° C., was added to an aqueous solution containing 4.5 parts of sodium hydroxide and 1.6 parts of the isocyanate-reactive compound (A1-e) in 313 parts of deionized water with stirring at a high speed and thereby yielded a dispersion containing a carboxyl-group-containing polymer terminally having an alkoxysilyl group, whose carboxyl group may be in the form of a salt. Acetone was the removed from the dispersion by distillation at 45° C. to 50° C. under reduced pressure, the resulting dispersion was adjusted to a solid content of 40% with deionized water and thereby yielded a water-based silanolated resin composition.

In a flask in a thermostatic bath at 80° C., 100 parts of the water-based silanolated resin composition (stock composition) and 7 parts of sodium stearate were placed with stirring, the resulting mixture was then taken out from the flask 1 hour later, was placed in a stick-shaped case without delay, was left stand to cool and thereby yielded a stick adhesive.

Example 11

A water-based silanolated resin composition was prepared by the procedure of Example 1. In a flask in a thermostatic bath at 80° C., 100 parts of the water-based silanolated resin composition (stock composition, solid content 40%), 7 parts of sodium stearate, and 1.0 part of the hydrophilic compound (1) were placed with stirring, the resulting mixture was then taken out from the flask 1 hour later, was placed in a stick-shaped case without delay, was left stand to cool and thereby yielded a stick adhesive.

Example 12

A water-based silanolated resin composition was prepared by the procedure of Example 1. In a flask in a thermostatic bath at 80° C., 100 parts of the water-based silanolated resin composition (stock composition, solid content 40%), 7 parts of sodium stearate, and 5.0 parts of the hydrophilic compound (1) were placed with stirring, the resulting mixture was then taken out from the flask 1 hour later, was placed in a stick-shaped case without delay, was left stand to cool and thereby yielded a stick adhesive.

Example 13

A water-based silanolated resin composition was prepared by the procedure of Example 1. In a flask in a thermostatic bath at 80° C., 100 parts of the water-based silanolated resin composition (stock composition, solid content 40%), 7 parts of sodium stearate, and 20 parts of the hydrophilic compound (1) were placed with stirring, the resulting mixture was then taken out from the flask 1 hour later, was placed in a stick-shaped case without delay, was left stand to cool and thereby yielded a stick adhesive.

Example 14

A water-based silanolated resin composition was prepared by the procedure of Example 1. In a flask in a thermostatic bath at 80° C., 100 parts of the water-based silanolated resin composition (stock composition, solid content 40%), 7 parts of sodium stearate, and 5.0 parts of the hydrophilic compound (2) were placed with stirring, the resulting mixture was then taken out from the flask 1 hour later, was placed in a stick-shaped case without delay, was left stand to cool and thereby yielded a stick adhesive.

Example 15

A water-based silanolated resin composition was prepared by the procedure of Example 1. In a flask in a thermostatic bath at 80° C., 100 parts of the water-based silanolated resin composition (stock composition, solid content 40%), 7 parts of sodium stearate, and 5.0 parts of the hydrophilic compound (3) were placed with stirring, the resulting mixture was then taken out from the flask 1 hour later, was placed in a stick-shaped case without delay, was left stand to cool and thereby yielded a stick adhesive.

Example 16

A water-based silanolated resin composition was prepared by the procedure of Example 1. In a flask in a thermostatic bath at 80° C., 100 parts of the water-based silanolated resin composition (stock composition, solid content 40%), 7 parts of sodium stearate, and 0.03 part of the curing accelerator (1) were placed with stirring, the resulting mixture was then taken out from the flask 1 hour later, was placed in a stick-shaped case without delay, was left stand to cool and thereby yielded a stick adhesive.

Example 17

A water-based silanolated resin composition was prepared by the procedure of Example 1. In a flask in a thermostatic bath at 80° C., 100 parts of the water-based silanolated resin composition (stock composition, solid content 40%), 7 parts of sodium stearate, and 0.2 part of the curing accelerator (1) were placed with stirring, the resulting mixture was then taken out from the flask 1 hour later, was placed in a stick-shaped case without delay, was left stand to cool and thereby yielded a stick adhesive.

Example 18

A water-based silanolated resin composition was prepared by the procedure of Example 1. In a flask in a thermostatic bath at 80° C., 100 parts of the water-based silanolated resin composition (stock composition, solid content 40%), 7 parts of sodium stearate, and 0.03 part of the curing accelerator (2) were placed with stirring, the resulting mixture was then taken out from the flask 1 hour later, was placed in a stick-shaped case without delay, was left stand to cool and thereby yielded a stick adhesive.

Comparative Example 1

A stick adhesive was prepared by the procedure of Example 1, except that the amino-group-containing alkoxysilane (A4-a) was not used. Namely, in the stick adhesive according to Comparative Example 1, the ends of the polymer serving as an adhesive component are not silanolated. The composition of the adhesive is shown in Table 2.

Comparative Example 2

In a flask in a thermostatic bath at 80° C., 100 parts of a commercially available urethane emulsion (trade name: "HYDRAN HW311" available from Dainippon Ink and Chemicals Incorporation) (stock composition) and 7 parts of sodium stearate were placed with stirring, the resulting mixture was then taken out from the flask 1 hour later, was placed in a stick-shaped case without delay, was left stand to cool but failed to yield a stick-shaped product. The composition of this adhesive is shown in Table 2.

Comparative Example 3

A commercially available stick adhesive (trade name "SUPERSTICK" available from Konishi Co., Ltd.; main component: polyvinylpyrrolidone) was used as a stick adhesive.

The properties and proportions of the water-based silanolated resin compositions according to Examples 1 to 10 are shown in Tables 1 and 2. In Tables 1 and 2, the term "NCO/NCO-reactive group (equivalent ratio)" means the equivalent ratio (NCO/NCO-reactive group) of an isocyanate group (NCO) in a polyisocyanate compound to an isocyanate-reactive group (NCO-reactive group such as —OH and —NH$_2$) in a compound containing no anionic group and having plural isocyanate-reactive groups and a compound having an anionic group and plural isocyanate-reactive groups. The term "Carboxyl group content (%)" means the content (%) of a carboxyl group (COOH) in a carboxyl-group-containing polymer terminally having an alkoxysilyl group. If the carboxyl group in question is in the form of a salt, it is interpreted that the carboxyl group is not in the form of a salt. The term "Neutralization rate (%)" means the percentage (%) of carboxyl groups that form a salt by neutralization with sodium hydroxide, in the carboxyl-group-containing polymer terminally having an alkoxysilyl group. The term "Resin content (%)" means the percentage (%) of a water-based silanolated resin in a water-based silanolated resin composition. The term "Si content (%)" means the content (%) of silicon atoms (Si) in the water-based silanolated resin.

TABLE 1

|  | Example |  |  |  |  |  |
| --- | --- | --- | --- | --- | --- | --- |
|  | 1 | 2 | 3 | 4 | 5 | 6 |
| Isocyanate-reactive compound (A1-a) | 100 |  |  |  | 100 |  |
| Isocyanate-reactive compound (A1-b) |  | 100 |  |  |  |  |
| Isocyanate-reactive compound (A1-c) |  |  | 100 | 100 |  | 100 |
| Isocyanate-reactive compound (A1-d) | 7.7 | 7.7 | 7.7 | 7.7 | 6.9 | 7.7 |
| Isocyanate-reactive compound (A1-e) |  |  |  |  |  |  |
| Isocyanate-reactive compound (A2-1) | 16.7 | 16.7 | 16.7 | 16.7 | 16.7 | 16.7 |
| Polyisocyanate (A3-1) | 57 | 57 | 57 | 57 | 57 | 57 |
| Amino-group-containing alkoxysilane (A4-a) | 9.8 | 9.8 | 9.8 |  | 19.6 |  |
| Amino-group-containing alkoxysilane (A4-b) |  |  |  | 10.1 |  |  |
| Amino-group-containing alkoxysilane (A4-c) |  |  |  |  |  | 6.2 |
| Amino-group-containing alkoxysilane (A4-3) |  |  |  |  |  |  |
| Amino-group-containing alkoxysilane (A4-4) |  |  |  |  |  |  |
| Amino-group-containing alkoxysilane (A4-5) |  |  |  |  |  |  |
| Sodium hydroxide | 4.5 | 4.5 | 4.5 | 4.5 | 4.5 | 4.5 |
| Deionized water | 294 | 294 | 294 | 294 | 308 | 288 |
| NCO/NCO-reactive group (equivalent ratio) | 1.03 | 1.03 | 1.03 | 1.03 | 1.03 | 1.03 |
| Carboxyl group content (%) | 2.6 | 2.6 | 2.6 | 2.6 | 2.5 | 2.6 |
| Neutralization rate (%) | 100 | 100 | 100 | 100 | 100 | 100 |
| Resin content (%) | 40 | 40 | 40 | 40 | 40 | 40 |
| Si content (%) | 0.24 | 0.24 | 0.24 | 0.24 | 0.45 | 0.24 |
| Stock composition | 100 | 100 | 100 | 100 | 100 | 100 |
| Sodium stearate | 7 | 7 | 7 | 7 | 7 | 7 |
| Stick shape retention | Good | Good | Good | Good | Good | Good |
| Stick slidability | Good | Good | Good | Good | Good | Good |
| Adhesive hophornbeam/hophornbeam | 6.40 | 6.52 | 6.44 | 6.35 | 5.99 | 5.89 |
| strength hophornbeam/ABS | 4.59 | 3.76 | 3.84 | 4.24 | 3.41 | 3.77 |
| (N/mm$^2$) hophornbeam/steel plate | 4.60 | 3.34 | 3.50 | 3.59 | 3.73 | 3.31 |
| Water resistance | Good | Good | Good | Good | Good | Good |
| Heat resistance | Good | Good | Good | Good | Good | Good |
| Adhesion to glass | Good | Good | Good | Good | Good | Good |
| Contact property | Good | Good | Good | Good | Good | Good |
| Initial adhesion | — | — | — | — | — | — |

TABLE 2

|  | Example | | | | Comparative Example | | |
|---|---|---|---|---|---|---|---|
|  | 7 | 8 | 9 | 10 | 1 | 2 | 3 |
| Isocyanate-reactive compound (A1-a) |  |  |  |  | 100 |  |  |
| Isocyanate-reactive compound (A1-b) |  |  |  | 100 |  |  |  |
| Isocyanate-reactive compound (A1-c) | 100 | 100 | 100 |  |  |  |  |
| Isocyanate-reactive compound (A1-d) | 7.7 | 7.7 | 7.7 | 6.0 | 7.7 |  |  |
| Isocyanate-reactive compound (A1-e) |  |  |  | 1.6 |  |  |  |
| Isocyanate-reactive compound (A2-1) | 16.7 | 16.7 | 16.7 | 16.7 | 16.7 |  |  |
| Polyisocyanate (A3-1) | 57 | 57 | 57 | 60.6 | 57 |  |  |
| Amino-group-containing alkoxysilane (A4-a) |  |  |  |  |  |  |  |
| Amino-group-containing alkoxysilane (A4-b) |  |  |  |  | 20.7 |  |  |
| Amino-group-containing alkoxysilane (A4-c) |  |  |  |  |  |  |  |
| Amino-group-containing alkoxysilane (A4-3) | 3 |  |  |  |  |  |  |
| Amino-group-containing alkoxysilane (A4-4) |  | 4.3 |  |  |  |  |  |
| Amino-group-containing alkoxysilane (A4-5) |  |  | 3.3 |  |  |  |  |
| Sodium hydroxide | 4.5 | 4.5 | 4.5 | 4.5 | 4.5 |  |  |
| Deionized water | 283 | 285 | 284 | 313 | 279 |  |  |
| NCO/NCO-reactive group (equivalent ratio) | 1.03 | 1.03 | 1.03 | 1.07 | 1.03 |  |  |
| Carboxyl group content (%) | 2.7 | 2.7 | 2.7 | 2.4 | 2.7 |  |  |
| Neutralization rate (%) | 100 | 100 | 100 | 100 | 100 |  |  |
| Resin content (%) | 40 | 40 | 40 | 40 | 40 |  |  |
| Si content (%) | 0.24 | 0.24 | 0.24 | 0.47 | 0 |  |  |
| Stock composition | 100 | 100 | 100 | 100 | 100 | 100 |  |
| Sodium stearate | 7 | 7 | 7 | 7 | 7 | 7 |  |
| Stick shape retention | Good | Good | Good | Good | Fair | *1 | Good |
| Stick slidability | Good | Good | Good | Good | Fair | *1 | Good |
| Adhesive hophornbeam/hophornbeam | 5.38 | 5.32 | 5.22 | 6.81 | 3.77 | *1 | 0.64 |
| strength hophornbeam/ABS | 3.59 | 3.58 | 3.63 | 4.66 | 2.85 | *1 | 0.16 |
| (N/mm$^2$) hophornbeam/steel plate | 3.26 | 3.16 | 3.19 | 4.79 | 2.07 | *1 | 0.21 |
| Water resistance | Good | Good | Good | Good | Poor | *1 | Poor |
| Heat resistance | Good | Good | Good | Good | Good | *1 | Poor |
| Adhesion to glass | Good | Good | Good | Good | Poor | *1 | Poor |
| Contact properties | Good | Good | Good | — | Poor | *1 | Very poor |
| Initial adhesion | — | — | — | Good | — | *1 | — |

*1: The property in question could not be determined since the adhesive could not be formed into a stick.

Determination

The stick shape retention, stick slidability, adhesive strength, water resistance, heat resistance, and adhesion to glass of the stick adhesives according to Examples 1 to 10, Comparative Examples 1 and 3 were determined according to the following determination methods. In addition, the contact bonding property of the stick adhesives according to Examples 1 to 9 and Comparative Examples 1 and 3 and the initial adhesion of the stick adhesive according to Example 10 were determined, respectively, according to the following determination methods. Thus, the stick shape retention, stick slidability, adhesive strength, water resistance, heat resistance, adhesion to glass, contact bonding property, and initial adhesion (fast curing properties) were determined. The results are also shown in Table 1 and 2. The adhesive according to Comparative Example 2 could not be formed into a stick, and its properties could not be determined.

[Determination Method for Stick Shape Retention]

A stick adhesive was applied to a hophornbeam, a broad-leaved tree material, and the shape of the stick adhesive during and after the application was visually observed, and the stick shape retention was rated according to the following criteria. The determined results are shown in the column of "Stick shape retention" in the tables.

Criteria

Good: The stick adhesive keeps its original shape without distortion.

Fair: The stick adhesive becomes distorted to some extent.

Poor: The stick adhesive is brittle and immediately becomes distorted.

[Determination Method for Stick Slidability]

A stick adhesive was applied to a hophornbeam, a broad-leaved tree material, and ease of application of the stick adhesive was rated by sensory feeling according to the following criteria. The determined results are shown in the column of "Stick slidability" in the tables.

Criteria

Excellent: The stick adhesive is very easy to apply.

Good: The stick adhesive is easy to apply.

Fair: The stick adhesive is not applied smoothly to some extent and is difficult to apply.

Poor: The stick adhesive is very difficult to apply or cannot be applied.

[Determination Method for Adhesive Strength]

As adherends, hophornbeam/hophornbeam (each 100 mm×25 mm×5 mm), hophornbeam (100 mm×25 mm×5 mm)/molded plate (100 mm×25 mm×3 mm) made of an acrylonitrile-butadiene-styrene copolymer (ABS), and hophornbeam (100 mm×25 mm×5 mm)/stainless steel plate (100 mm×25 mm×2 mm) were used. Each three coats of a stick adhesive were applied to each one surface of the two adherends to an amount of about 30 g/m², and the two surfaces were attached and pressed with manual pressure at a temperature of 23° C. at a humidity of 55% RH. The resulting article was aged at a temperature of 23° C. at a humidity of 55% RH for 3 days. The shearing adhesive strength as the adhesive strength of the article was then determined according to Japanese Industrial Standards (JIS) K 6850 at a tensile speed of 5 mm/min using an Autograph available from Shimadzu Corporation. The determined results are shown in the column "Adhesive strength" in the tables. The results on the adherends hophornbeam/hophornbeam are shown in the column of "hophornbeam/hophornbeam", those on the adherends the hophornbeam/molded plate made of acrylonitrile-butadiene-styrene copolymer are shown in the column of "hophornbeam/ABS", and those on the adherends hophornbeam/stainless steel plate are shown in the column of "hophornbeam/steel plate" in the tables.

[Determination Method for Water Resistance]

Each three coats of a stick adhesive were applied to one surface of two adherends broad-leaved tree materials hophornbeam/hophornbeam (each 100 mm×25 mm×5 mm) to an amount of about 30 g/m², and the two surfaces were attached and pressed with manual pressure at a temperature of 23° C. at a humidity of 55% RH. The resulting article was aged at a temperature of 23° C. at a humidity of 55% RH for 3 days and was then immersed in water at 23° C. for 1 day. The adhesive strength of the resulting article was determined by a tensile shearing test according to JIS K 6850, and the water resistance of the stick adhesive according to the following criteria. The results are shown in the column of "Water resistance" in the tables.

Criteria

Excellent: The adhesive strength is 1.0 N/mm² or more.

Good: The adhesive strength is 0.2 N/mm² or more and less than 1.0 N/mm².

Poor: The adhesive strength is less than 0.2 N/mm².

[Determination Method for Heat Resistance]

Each three coats of a stick adhesive were applied to one surface of two adherends broad-leaved tree materials hophornbeam/hophornbeam (each 100 mm×25 mm×5 mm) to an amount of about 30 g/m², and the two surfaces were attached and pressed with manual pressure at a temperature of 23° C. at a humidity of 55% RH. The resulting article was aged at a temperature of 23° C. at a humidity of 55% RH for 3 days and was then left at 50° C. for 1 day. The adhesive strength of the resulting article was determined by a tensile shearing test according to JIS K 6850, and the heat resistance of the stick adhesive according to the following criteria. The results are shown in the column of "Heat resistance" in the tables.

Criteria

Good: The adhesive strength is 1.0 N/mm² or more.

Fair: The adhesive strength is 0.2 N/mm² or more and less than 1.0 N/mm².

Poor: The adhesive strength is less than 0.2 N/mm².

[Determination Method for Adhesion to Glass]

A stick adhesive was applied to a glass plate, a copy paper was then applied thereto and was pressed with manual pressure. The resulting article was aged at a temperature of 23° C. at a humidity of 55% RH for 1 day. The 180 degree peeling adhesive strength of the resulting article was determined at a tensile speed of 200 mm/min using an Autograph available from Shimadzu Corporation, and the adhesion to glass of the stick adhesive was rated according to the following criteria. The results are shown in the column of "Adhesion to glass" in the tables.

Criteria

Excellent: The paper is broken.

Good: The paper is partially broken.

Poor: The paper is not broken.

[Determination Method for Contact Bonding Property]

A coat of a stick adhesive was applied to each one surface of two stainless steel plates (each 100 mm×25 mm×2 mm) as adherends to an amount of about 30 g/m², and the two adherends were attached and pressed by manual pressure after an open time of about 300 seconds at a temperature of 23° C. at a humidity of 55% RH. Immediately thereafter, the shearing adhesive strength as the adhesive strength of the resulting article was determined according to JIS K 6850 at a tensile speed of 5 mm/min using an Autograph available from Shimadzu Corporation. The contact bonding property of the stick adhesive was then rated according to the following criteria. The results are shown in the column of "Contact bonding property" in the tables.

Criteria

Good: The adhesive strength is 150 mN/mm² or more and the effective bonding area is 70% or more.

Poor: The adhesive strength is less than 50 mN/mm² or the effective bonding area is 10% or more and less than 30%.

Very poor: The adherends cannot be bonded.

[Determination Method for Initial Adhesion]

Each three coats of a stick adhesive were applied to each one surface of two adherends broad-leaved tree material hophornbeam/hophornbeam (each 100 mm×25 mm×5 mm) to an amount of about 30 g/m², and the two faces were attached and pressed with manual pressure at a temperature of 23° C. at a humidity of 55% RH without delay. The resulting article was aged at a temperature of 23° C. at a humidity of 55% RH for 3 minutes, and the initial adhesive strength of the stick adhesive was determined by a tensile shearing test according to JIS K 6850, and the initial adhesion (fast curing property) of the stick adhesive was rated according to the following criteria. The results are shown in the column of "Initial adhesion" in the tables.

Criteria

Good: The adhesive strength is 1.0 N/mm² or more.

Poor: The adhesive strength is less than 1.0 N/mm².

In the criteria in the tests, "Excellent", "Good", "Fair", and "Poor" basically mean "Outstanding", "Good", "Average", and "Unsatisfactory", respectively.

The tables show that the stick adhesives of Examples 1 to 10 according to the present invention have excellent fitting after attachment, can easily bond adherends with each other with good workability (applying workability). They also have excellent adhesion to plastics, metals, and glass. In addition, the stick adhesives of Examples 1 to 9 can bond adherends by contact bonding. The stick adhesive of Example 10 has very excellent initial adhesion and can bond adherends immediately after application. The stick adhesives also exhibit good water resistance and heat resistance after application.

The coating performance, spread, bonding reproducibility, and contact bonding property of the stick adhesives of Examples 11 to 15 were determined according to the following determination methods and the aforementioned determination method for contact bonding property. The results show that the stick adhesives of Examples 11 to 15 according to the present invention have excellent coating performance and can be smoothly applied without resistance. They can be easily applied in a satisfactory spread. In particular, the stick adhesives of Examples 12, 13 and 15 can be very easily applied in a satisfactory spread without unevenness. The stick adhesives also have excellent bonding reproducibility and can effectively exhibit stable adhesive capabilities. Naturally, they can bond adherends by contact bonding with a long open time (time period within which adherends can be attached) and exhibit excellent contact bonding property.

The storage stability and adhesive strength development time of the stick adhesives of Examples 16 to 18 were determined according to the following determination methods, and the storage stability and fast curing property of the stick adhesives were rated. The results show that they keep their excellent storage stability and have a short minimum aging time that can allow the adhesives to exhibit an adhesive strength of 1.0 N/mm$^2$ or more and thereby have further improved fast curing property.

In contrast, the stick adhesive according to Comparative Example 1 has poor shape retention and slidability, low adhesive strength to adherends, poor water resistance and poor adhesion to glass and cannot bond adherends by contact bonding. The adhesive according to Comparative Example 2 could not be formed into a stick. The stick adhesive according to Comparative Example 3 has good shape retention and slidability but has poor adhesive strength to adherends, water resistance, heat resistance and adhesion to glass and cannot bond adherends by contact bonding.

[Determination Method for Coating Performance]

A stick adhesive was applied to paper by pressing while sliding sideward, and the resistance during this procedure was determined by sensory feeling, and the coating performance was rated. The coating performance is rated better with more smooth coating.

[Determination Method for Spread]

A stick adhesive was applied to a surface of hophornbeam, a broad-leaved tree material by three reciprocating operation. The coated amount in this procedure was determined and rated as the spread. The spread is rated better with an increasing amount.

[Determination Method for Bonding Reproducibility]

Each three coats of a stick adhesive were applied to each one mating surface of two adherends broad-leaved tree material hophornbeam/hophornbeam (each 100 mm×25 mm×5 mm), and the two mating surfaces were attached and pressed with manual pressure at a temperature of 23° C. at a humidity of 556 RH without delay and thereby yielded three test specimens bonded by the stick adhesive. The test specimens was aged at a temperature of 23° C. at a humidity of 55% RH for 3 days, and the shearing adhesive strength of the test specimens was determined according to JIS K 6850 at a tensile speed of 5 mm/min using an Autograph available from Shimadzu Corporation. The mean of the adhesive strength of the three test specimens and the variation from the mean were determined, and the bonding reproducibility was rated. The bonding reproducibility is rated better with a decreasing variation in the total test specimens.

[Determination Method for Storage Stability]

The stick shape retention, initial adhesion and spread of a stick adhesive were determined according to the aforementioned determination methods before and after storage at 50° C. for 30 days. The storage stability of the stick adhesive after storage at 50° C. for 30 days was rated with reference to the shape retention, initial adhesion, and spread of the stick adhesive. The storage stability is rated better with less changes in the shape retention, initial adhesion, and spread between before and after storage.

[Determination Method for Adhesive Strength Development Time]

Each three coats of a stick adhesive were applied to each one mating surface of two adherends broad-leaved tree material hophornbeam/hophornbeam (each 100 mm×25 mm×5 mm) to an amount of about 30 g/m$^2$, and the two mating surfaces were attached and pressed with manual pressure at a temperature of 23° C. at a humidity of 55% RH without delay. The resulting article was aged at a temperature of 23° C. at a humidity of 55% RH for a predetermined time, and the adhesive strength of the article was determined according to a tensile shearing test according to JIS K 6850. The aging time (cure time) required to exhibit an adhesive strength of 1.0 N/mm$^2$ or more was determined. The fast curing performance is rated better with a shorter minimum aging time to exhibit an adhesive strength of 1.0 N/mm$^2$ or more.

INDUSTRIAL APPLICABILITY

As is described above, the self-curable water-based solid adhesives of the present invention can be applied with good workability (good coating performance), have good fitting after attachment, have good adhesion to plastics, metals and glass and exhibit excellent heat resistance and water resistance after curing. They are highly safe to humans and the environment. They also have excellent shape retention and slidability and can be easily applied. In addition, they can bond adherends by contact bonding despite that they are water-based solid adhesives. Accordingly, the self-curable water-based solid adhesives of the present invention are very useful as stick adhesives.

The invention claimed is:

1. A self-curable water-based solid adhesive comprising the following components (A), (B), (C), and (D):
   (A) an anionic-group-containing polymer terminally having an alkoxysilyl group, the polymer being a reaction product of a compound (A1) containing no anionic group and having plural isocyanate-reactive groups, a compound (A2) having an anionic group and plural isocyanate-reactive groups, a polyisocyanate compound (A3), and an alkoxysilane compound (A4) containing an isocyanate-reactive group, the compound having a secondary amino group and being a reaction product of an alkoxysilane compound having a primary amino group and a secondary amino group with an unsaturated carboxylic ester;
   (B) a basic compound;
   (C) water; and
   (D) a gelling agent.

2. The self-curable water-based solid adhesive according to claim 1, which is a gelled product of a water-based resin composition by action of the gelling agent (D), the water-based resin composition comprising the anionic-group-containing polymer (A) terminally having an alkoxysilyl group, the basic compound (B), and water (C).

3. The self-curable water-based solid adhesive according to claim 2, wherein the anionic group of the anionic-group-containing polymer (A) terminally having an alkoxysilyl group is neutralized by the basic compound (B), and the alkoxysilyl group at the end of the anionic-group-containing polymer (A) is hydrolyzed by the water (C) in the water-based resin composition gelled by action of the gelling agent (D).

4. The self-curable water-based solid adhesive according to claim 1, wherein the anionic-group-containing polymer (A) terminally having an alkoxysilyl group is an anionic-group-containing polymer having an alkoxysilylated end and being a reaction product of an anionic-group-containing polymer and the alkoxysilane compound (A4) containing an isocyanate-reactive group, the anionic-group-containing polymer being a reaction product among the compound (A1) containing no anionic group and having plural isocyanate-reactive groups, the compound (A2) having an anionic group and plural isocyanate-reactive groups, and the polyisocyanate compound (A3).

5. The self-curable water-based solid adhesive according to claim 1, wherein the compound (A1) containing no anionic group and having plural isocyanate-reactive groups comprises a compound (A1-1) having a number-average molecular weight of equal to or more than 500, containing no anionic group and having plural isocyanate-reactive groups, and a compound (A1-2) having a number-average molecular weight of less than 500, containing no anionic group and having plural isocyanate-reactive groups.

6. The self-curable water-based solid adhesive according to claim 1, wherein the anionic group is a carboxyl group.

7. The self-curable water-based solid adhesive according to claim 1, wherein the compound (A2) having an anionic group and plural isocyanate-reactive groups is a dimethylolalkanoic acid.

8. The self-curable water-based solid adhesive according to claim 1, wherein the alkoxysilane compound (A4) containing an isocyanate-reactive group is an alkoxysilane compound having a secondary amino group and being a reaction product of an alkoxysilane compound having at least a primary amino group with an unsaturated carboxylic ester (A5).

9. The self-curable water-based solid adhesive according to claim 1, wherein the ratio of the basic compound (B) to the anionic group of the anionic-group-containing polymer (A) terminally having an alkoxysilyl group is 50% to 120% by mole.

10. The self-curable water-based solid adhesive according to claim 1, wherein the ratio of the polyisocyanate compound (A3) to the compound (A1) containing no anionic group and having plural isocyanate-reactive groups and the compound (A2) having an anionic group and plural isocyanate-reactive groups is such that the equivalent ratio [NCO/NCO-reactive group] of the isocyanate group in the polyisocyanate compound (A3) to the isocyanate reactive groups in the compound (A1) and the compound (A2) is more than 1 and less than or equal to 1.5.

11. The self-curable water-based solid adhesive according to claim 1, wherein the content of the anionic group in the anionic-group-containing polymer (A) terminally having an alkoxysilyl group is 0.2% to 5.0% by mass.

12. The self-curable water-based solid adhesive according to claim 1, wherein the content of silicon atom in the anionic-group-containing polymer (A) terminally having an alkoxysilyl group is 0.05% to 1% by mass.

13. The self-curable water-based solid adhesive according to claim 1, further comprising a polyoxyalkylene compound (E) having an unsaturated-bond-containing organic group and at least an oxyethylene unit.

14. The self-curable water-based solid adhesive according to claim 12, wherein the polyoxyalkylene compound (E) is a polyoxyalkylene compound having an unsaturated-bond-containing group at its end corresponding to a polyoxyalkylene glycol having at least a polyoxyethylene unit except with one of aryl groups, cycloalkenyl groups, cycloalkadienyl groups, and vinyl group introduced into at least one of its ends.

15. The self-curable water-based solid adhesive according to claim 13, wherein the polyoxyalkylene compound (E) has a number-average molecular weight of 100 to 5000.

16. The self-curable water-based solid adhesive according to claim 13, wherein the proportion of the polyoxyalkylene compound (E) is 0.1 to 50 parts by mass to 100 parts by mass of the anionic-group-containing polymer (A) terminally having an alkoxysilyl group.

17. The self-curable water-based solid adhesive according to claim 1, further comprising a curing accelerator (F) represented by following Formula (1):

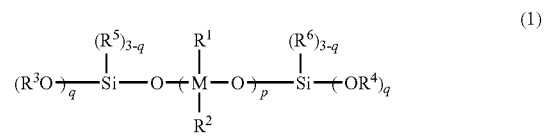

(1)

wherein M is one of tin atom, titanium atom, zirconium atom and bismuth atom; $R^1$ and $R^2$ are the same or different and are each a hydrocarbon group; $R^3$ and $R^4$ are the same or different and are each a hydrogen atom or a hydrocarbon group; $R^5$ and $R^6$ are the same or different and are each a hydrogen atom or a hydrocarbon group; p is an integer equal to or more than 1; and q is an integer from 1 to 3.

18. A bonding method comprising the step of performing contact bonding using the self-curable water-based solid adhesive according to claim 1.

* * * * *